US012711839B2

(12) United States Patent
Tapadia

(10) Patent No.: US 12,711,839 B2
(45) Date of Patent: Aug. 18, 2026

(54) INTEGRATED PRIMARY AND SECONDARY GAMING SYSTEM

(71) Applicant: TOUCHMAGIX MEDIA PVT. LTD., Pune (IN)

(72) Inventor: Anup Tapadia, Pune (IN)

(73) Assignee: TOUCHMAGIX MEDIA PVT. LTD., Pune (IN)

( * ) Notice: Subject to any disclaimer, the term of this patent is extended or adjusted under 35 U.S.C. 154(b) by 199 days.

(21) Appl. No.: 18/668,621

(22) Filed: May 20, 2024

(65) Prior Publication Data

US 2025/0029451 A1 Jan. 23, 2025

(51) Int. Cl.
*G07F 17/00* (2006.01)
*G07F 17/32* (2006.01)

(52) U.S. Cl.
CPC ...... *G07F 17/3267* (2013.01); *G07F 17/3211* (2013.01); *G07F 17/3237* (2013.01); *G07F 17/3244* (2013.01); *G07F 17/3297* (2013.01)

(58) Field of Classification Search
None
See application file for complete search history.

(56) References Cited

U.S. PATENT DOCUMENTS

| | | | | |
|---|---|---|---|---|
| 5,397,134 A * | 3/1995 | Fishman | G07F 17/32 221/210 |
| 6,007,426 A | 12/1999 | Kelly et al. | |
| D433,716 S * | 11/2000 | Robrahn | D21/325 |
| D465,810 S * | 11/2002 | Bartholomew | D21/325 |
| D596,677 S * | 7/2009 | Tsuda | D21/325 |
| 7,857,318 B1 * | 12/2010 | Shoemaker, Jr. | G07F 17/3297 273/447 |
| 7,951,008 B2 | 5/2011 | Wolf et al. | |

(Continued)

FOREIGN PATENT DOCUMENTS

| | | |
|---|---|---|
| CN | 201510792106 A | 3/2016 |
| JP | 2014111197 A | 6/2014 |
| KR | 102218596 B1 | 2/2021 |

OTHER PUBLICATIONS

YouTube search at Joystick posted on Jan. 31, 2020 at https://www.youtube.com/watch?v=9yOiHDnP4C0 accessed on Jan. 24, 2026. (Year: 2020).*

(Continued)

*Primary Examiner* — Paul A D'Agostino
(74) *Attorney, Agent, or Firm* — Davé Law Group, LLC; Raj S. Davé

(57) ABSTRACT

An embodiment describes a system. The system comprises a primary gaming unit that provides a primary game to a user, and a secondary gaming unit that provides a secondary game. In an embodiment, the primary gaming unit comprises a controller and a picker to pick an object. The controller is operable to receive a command to move the picker; move the picker in a preferred direction according to the command; and move the picker in a downward direction to pick the object. In an embodiment, a collection of sensors provides a signal to determine first output of the primary game, and starts a secondary game via secondary gaming unit based on the first output of the primary game. The primary gaming unit is integrated with the secondary gaming unit. The first output of the primary game is in tandem to a second output of the secondary game.

19 Claims, 19 Drawing Sheets

(56) References Cited

U.S. PATENT DOCUMENTS

| | | | | |
|---|---|---|---|---|
| 8,079,596 | B1 * | 12/2011 | Shoemaker, Jr. | G07F 17/3297 273/447 |
| 8,251,369 | B2 * | 8/2012 | Verstraeten | A63F 9/30 273/447 |
| 8,506,373 | B2 | 8/2013 | Stelzer et al. | |
| 8,632,406 | B2 | 1/2014 | Hedrick et al. | |
| 8,721,431 | B2 | 5/2014 | Kisenwether et al. | |
| 10,565,830 | B1 * | 2/2020 | Georgilas | G07F 17/3297 |
| 10,621,820 | B2 | 4/2020 | Arnone et al. | |
| 10,839,651 | B2 * | 11/2020 | Smart | G07F 17/3213 |
| 11,288,930 | B1 | 3/2022 | Lim et al. | |
| 11,423,742 | B2 * | 8/2022 | Harris | G07F 17/3255 |
| 2004/0152522 | A1 | 8/2004 | Gerding | |
| 2007/0087834 | A1 * | 4/2007 | Moser | G07F 17/3255 463/42 |
| 2009/0191931 | A1 * | 7/2009 | Peck | G07F 17/3202 463/7 |
| 2011/0086687 | A1 * | 4/2011 | Guarnieri | G07F 17/3295 273/448 |
| 2011/0115163 | A1 * | 5/2011 | Guarnieri | G07F 17/3297 273/448 |
| 2011/0180998 | A1 * | 7/2011 | Verstraeten | G07F 17/3297 273/447 |
| 2013/0231166 | A1 * | 9/2013 | Riggles | G07F 17/3297 273/447 |
| 2021/0056803 | A1 * | 2/2021 | Harris | G07F 17/3239 |

OTHER PUBLICATIONS

YouTube Joystick posted on Jan. 21, 2020 at https://www.youtube.com/watch?v=9yOiHDnP4C0 accessed on Jan. 24, 2026. (Year: 2020).*

* cited by examiner

INTEGRATED PRIMARY AND SECONDARY GAMING SYSTEM

CROSS-REFERENCE TO RELATED APPLICATION(S)

This application claims priority to Indian Patent Application No. 202321049101, filed Jul. 20, 2023, the disclosure of which is hereby incorporated by reference in its entirety.

FIELD OF THE INVENTION

This disclosure relates generally to gaming systems and, more particularly, to a gaming system comprising a primary gaming unit integrated with a secondary gaming unit.

BACKGROUND

"A "dual" gaming unit or machine is configured to implement both one or more traditional casino-style wagering games, such as games having outcomes determined primarily by chance and not skill, and one or more games which are traditionally not casino style games, such as amusement-type games or games having amusement-type game components, such as games where the outcome is determined substantially by skill. The wagering game portion of the gaming machine may award monetary awards to the player for winning wagering game outcomes, and the amusement portion of the gaming machine may be used to award promotional prizes to the player. A player rewards system may include such dual gaming units or other award dispensing mechanisms." [Source: U.S. Pat. No. 11,423,742B2, titled "Player tracking system with prizes awarded via skill/amusement gaming device play", published as on 23 Aug. 2022]

"An electronic gaming machine is provided. In an entertainment game, utilization of an entertainment game element by a player may trigger a wager in accordance with a gambling proposition. Based on the outcome of the wager, the player may be awarded an intermediate in-game resource for use in the entertainment game. The intermediate in-game resource may be used by the player to acquire an entertainment game resource or element that may be used to enhance the player's play of the entertainment game." [Source: U.S. Pat. No. 10,621,820B2, titled "Intermediate in-game resource hybrid gaming system", published as on 14 Apr. 2020]

"The present invention relates to a video game adapter system for housing a home video game system and its required monitor or television and converting to at least one arcade style feature. Multiple game systems can be housed within the cabinet to allow for even a greater variety of games to be played. Additionally, other audio-visual components may be housed within the cabinet of the present invention such as, for example, a Digital Video Disc ("DVD") player, Compact Disc ("CD") player, radio receiver, VCR, and/or an audio cassette player to make the cabinet into a full range entertainment center. The invention allows multiple game systems to be connected simultaneously to a universal control device, game systems and games can be selected quickly and easily." [Source: U.S. Pat. No. 10,621,820B2, titled "Intermediate in-game resource hybrid gaming system", published as on 14 Apr. 2020]

"The present invention relates to a video game adapter system for housing a home video game system and its required monitor or television, and converting to at least one arcade style feature. Multiple game systems can be housed within the cabinet to allow for even a greater variety of games to be played. Additionally, other audio-visual components may be housed within the cabinet of the present invention such as, for example, a Digital Video Disc ("DVD") player, Compact Disc ("CD") player, radio receiver, VCR, and/or an audio cassette player to make the cabinet into a full range entertainment center. The invention allows multiple game systems to be connected simultaneously to a universal control device, game systems and games can be selected quickly and easily." [Source: Patent Application No. 20040152522A1, titled "Arcade style video game adapter system", published as on 5 Aug. 2004]

"Game machine comprising a housing with a number of upright walls, said housing being adapted to accommodate playing means, for instance pick-up means such as a picker; wherein the upright walls of the housing comprise at least one translucent panel; and a pattern of multicolor LEDs is provided on the inner side of the housing behind this at least one translucent panel, said multicolor LEDs being connected to a control unit for controlling the color emitted by each multicolor LED, which control unit and at least one translucent panel are adapted to impart a determined impression of color to the at least one panel." [Source: U.S. Pat. No. 8,251,369B2, titled "Game machine", published as on 28 Aug. 2012]

Therefore, there is a long-felt need for a gaming system that provides excitement to the players by combining aspects of a primary game and a secondary game.

SUMMARY OF INVENTION

The following presents a summary to provide a basic understanding of one or more embodiments described herein. This summary is not intended to identify key or critical elements or delineate any scope of the different embodiments and/or any scope of the claims. The sole purpose of the summary is to present some concepts in a simplified form as a prelude to the more detailed description presented herein.

Disclosed are a system, a method, and a non-transitory storage medium of a gaming system.

In an aspect, a system is described. The system comprises a primary gaming unit that provides a primary game to a user; and a secondary gaming unit that provides a secondary game. The system also comprises an integrated gaming controller. The integrated gaming controller is operable to start a first play in the primary game through the primary gaming unit; and start a second play in the secondary game through the secondary gaming unit based on a first output of the primary game. The primary gaming unit is integrated with the secondary gaming unit through the integrated gaming controller. The first output of the primary game is in tandem to a second output of the secondary game.

In another embodiment, the primary game comprises one of a physical game, an arcade game, an online game, a client-server game, a video game, an electronic game, a digital game, and a stand-alone game.

In yet another embodiment, the secondary game comprises one of a physical game, an arcade game, an online game, a client-server game, a video game, an electronic game, a digital game, and a stand-alone game.

In an embodiment, the primary gaming unit comprising the physical game as the primary game comprises a picker to pick an object, and a controller. The controller is operable to receive a command to move the picker through an input device; move the picker in an x direction, y direction and z direction according to the command; and move the picker in a downward direction to pick the object. In an embodiment, a collection of sensors provides a first signal to determine that the object is picked as a first output of the primary game.

In yet another embodiment, both the primary game and the secondary game comprise a game of skill.

In yet another embodiment, both the primary game and the secondary game comprise a game of chance.

In yet another embodiment, the primary game further comprises a gantry that supports the picker.

In yet another embodiment, the primary gaming unit further comprises a rack to place the object.

In yet another embodiment, the object is placed on the collection of sensors.

In yet another embodiment, the collection of sensors comprises a collection of infrared proximity sensors, RFID readers, light sensors, movement sensors, and weight sensors.

In yet another embodiment, the object comprises an RFID tag.

In yet another embodiment, when the object is picked by the picker, the first output of the primary game is set as true, generating a primary reward, and the primary game is ended.

In yet another embodiment, when the picker fails to pick the object, the first output of the primary game is set as false.

In yet another embodiment, the secondary gaming unit comprising the digital game as the secondary game comprises a processing circuitry configured to: receive an activation signal from the primary gaming unit when the first output of the primary game is set as true; activate the secondary game upon receiving the activation signal; execute the secondary game in response to a user input received through an input device; and generate a secondary reward, based on the second output of the secondary game, wherein the secondary reward comprises one of a token, a ticket, a printed receipt, a point, a playing chance, a digital receipt, and a gift.

In yet another embodiment, the secondary reward of the secondary game is redeemed from an automated prize redemption kiosk.

In yet another embodiment, the processing circuitry is configured to credit the playing chance to the user when the first output of the primary game is set as true, wherein the playing chance enables the user to play one of the primary game and the secondary game.

In yet another embodiment, the processing circuitry is configured to credit the playing chance to the user, by at least one of physically through a prepaid card and remotely online.

In yet another embodiment, the secondary reward of the secondary game further comprises an extra play in the primary gaming unit.

In yet another embodiment, the secondary game comprises a display communicatively coupled to the processing circuitry, wherein the processing circuitry communicates a second signal to the display to depict the secondary game, a point won by the user, a reward point, a recommendation, a suggestion, and a hint (e.g., feedback, suggestion) for winning the secondary game.

In yet another embodiment, the processing circuitry is configured to monitor the second output of the secondary game.

In yet another embodiment, the processing circuitry is configured to execute an additional play based on the second output of the secondary game.

In yet another embodiment, the processing circuitry is configured to credit a playing chance based on the second output of the secondary game.

In yet another embodiment, the processing circuitry communicates a dispensing command to a dispenser to dispense at least one of a gift, a token, cash, a coin, a printed receipt, and a ticket to the user based on the second output of the secondary game.

In yet another embodiment, the display device comprises an interactive display.

In yet another embodiment, the display device comprises at least one of a Light-emitting diode (LED) display, a Liquid-crystal display (LCD) display, an organic light-emitting diode (OLED), a transparent display, a hologram, a projector, an augmented reality display, a virtual reality display, a mixed reality display, and a plasma display.

In yet another embodiment, the input device comprises at least one of a joystick, a button, arrow keys, a keypad, a touchpad, a scanner, a token receiver, a credential validator, and a coin receiver.

In yet another embodiment, a credential to enable the primary gaming unit for a player is verified through the credential validator, wherein the credential comprises one of a token, a bill, cash, a coin, a prepaid card, a smart card, an electronic card, a receipt, and a radio frequency identification (RFID) card.

In yet another embodiment, the system receives a token physically through the token receiver of the input device.

In yet another embodiment, the system receives the command to move the picker via, or through, at least one of the joystick, the button, the arrow keys, the keypad, and the touchpad from the input device.

In yet another embodiment, the picker is one of a claw and a crane.

In yet another embodiment, the automated prize redemption kiosk comprises a housing containing one or more rewards, a dispenser controller, and a reward dispenser. The dispenser controller is configured to receive information regarding the reward associated with a player for the secondary gaming unit and to cause the reward dispenser to dispense one of the primary reward and the secondary reward.

In yet another embodiment, the reward dispenser dispenses at least one of a gift, a token, cash, a coin, and a ticket to the user based on one of the first output of the primary game and the second output of the secondary game.

In yet another embodiment, the primary gaming unit further comprises a remote control signal reception unit that receives at least one of a first virtual control signal and a second virtual control signal from a remote environment.

In yet another embodiment, the remote environment comprises one of an augmented reality environment, a virtual reality environment and a mixed reality environment.

In yet another embodiment, the remote environment generates a virtual model of the primary gaming unit.

In yet another embodiment, the virtual model comprises a virtual representation of the primary gaming unit and a virtual user interface object at a respective location in the virtual representation of the primary gaming unit.

In yet another embodiment, the virtual model comprises a virtual three-dimensional model.

In yet another embodiment, the virtual model receives an input through at least one of the virtual representation of the primary gaming unit and the virtual user interface object in the virtual representation.

In yet another embodiment, the virtual model communicates at least one of the first virtual control signal and the second virtual control signal to the remote control signal reception unit in response to the input.

In yet another embodiment, the remote environment comprises at least one of an augmented reality headset, augmented reality glasses, a virtual reality headset, and a virtual reality glass.

In yet another embodiment, the player selects a game from one or more games in the remote environment.

In yet another embodiment, the system further comprises an artificial intelligence engine.

In yet another embodiment, the artificial intelligence engine learns continuously from an input, a play of the player depicting a behavior of the player, to generate a recommendation, a hint, and a suggestion to enhance the play of the player that is ongoing of one of the primary game and the secondary game.

In yet another embodiment, the artificial intelligence engine improves the play in the future by learning from the play of the player, and the behavior of the player.

In yet another embodiment, the primary gaming unit comprises a plurality of physical gaming cabinets synchronized with each other towards an objective.

In yet another embodiment, the system enables multiple users to play the primary game and the secondary game.

In yet another embodiment, the processing circuitry comprises a software application.

In yet another embodiment, the software application comprises a stand-alone application.

In yet another embodiment, the software application comprises a client-server application.

In yet another embodiment, both the primary gaming unit and the secondary gaming unit comprise a game of chance.

In yet another embodiment, the secondary gaming unit comprises a user authentication unit to verify an identity of the user.

In yet another embodiment, the system comprises at least one of a tertiary gaming unit and a quaternary gaming unit integrated with the primary gaming unit and the secondary gaming unit respectively.

In yet another embodiment, the tertiary gaming unit comprises a tertiary game comprising one of a physical game, an arcade game, an online game, a client-server game, a video game, an electronic game, a digital game, and a stand-alone game.

In yet another embodiment, the quaternary gaming unit provides a quaternary game comprising one of a physical game, an arcade game, an online game, a client-server game, a video game, an electronic game, a digital game, and a stand-alone game.

In yet another embodiment, the remote environment provides a video feed for at least one of the primary gaming unit, the secondary gaming unit, a tertiary gaming unit and a quaternary gaming unit.

In yet another embodiment, the user is enabled to interact with at least one of the primary gaming unit, the secondary gaming unit, a tertiary gaming unit and a quaternary gaming unit through the video feed and to communicate at least one of a first virtual control signal and a second virtual control signal to play at least one of the primary game and the secondary game in real-time.

In one embodiment, the primary gaming unit comprising the digital game as the primary game comprises: a controller to activate a playing chance for the primary game; execute the primary game in response to a user input received through an input device; determine the first output of the primary game; and communicate an activation signal to the primary gaming unit when the first output of the primary game is set as true.

In one embodiment, the secondary gaming unit comprising the physical game as the secondary game comprises: a picker to pick an object; a processing circuitry. The processing circuitry is operable to: receive the activation signal from the primary gaming unit when the first output of the primary game is set as true; receive a command to move the picker through the input device; move the picker in at least one of an x-direction, y direction and z-direction according to the command; and move the picker in a downward direction to pick the object. A collection of sensors provides a first signal to determine the object is picked as the first output of the secondary game. The secondary gaming unit generates a secondary reward, based on the second output of the secondary game, wherein the secondary reward comprises one of a token, a ticket, a printed receipt, a point, the playing chance, a digital receipt, and a gift.

An embodiment relates to a method comprising receiving a credential to start a primary game; starting a first play in a primary game through a primary gaming unit; and starting a second play in a secondary game through a secondary gaming unit based on a first output of the primary game. The primary gaming unit and the secondary gaming unit are connected to each other through an integrated gaming controller. The first output of the primary gaming unit and the secondary gaming unit are in tandem.

Another embodiment relates to a non-transitory computer storage medium storing a sequence of instructions which, when executed by a processor, causes receiving a credential to start a primary game; start a first play in a primary game through a primary gaming unit; and start a second play in a secondary game through a secondary gaming unit based on a first output of the primary game. The primary gaming unit and the secondary gaming unit are connected to each other through an integrated gaming controller. The first output of the primary gaming unit and a second output of the secondary gaming unit are in tandem.

In an embodiment, the system further comprises a cyber security module wherein the cyber security module comprises an information security management module providing isolation between the communication module and servers.

In an embodiment, the information security management module is operable to: receive data from the communication module, exchange a security key at a start of the communication between the communication module and the server, receive the security key from the server, authenticate an identity of the server by verifying the security key, analyze the security key for a potential cyber security threat, negotiate an encryption key between the communication module and the server, encrypt the data, and transmit the encrypted data to the server when no cyber security threat is detected.

In an embodiment, the information security management module is operable to: exchange a security key at a start of the communication between the communication module and the server, receive the security key from the server, authenticate an identity of the server by verifying the security key, analyze the security key for a potential cyber security threat, negotiate an encryption key between the system and the server, receive encrypted data from the server, decrypt the encrypted data, perform an integrity check of the decrypted data, and transmit the decrypted data to the communication module when no cyber security threat is detected.

In an embodiment, the system further comprises a cyber security module wherein the cyber security module comprises an information security management module providing isolation between the communication module and servers.

In an embodiment, the information security management module is operable to, receive data from the communication module, exchange a security key at a start of the communication between the communication module and the server, receive the security key from the server, authenticate an identity of the server by verifying the security key, analyze the security key for a potential cyber security threat, negotiate an encryption key between the communication module and the server, encrypt the data, and transmit the encrypted data to the server when no cyber security threat is detected.

In an embodiment, the information security management module is operable to exchange a security key at a start of the communication between the communication module and the server, receive the security key from the server, authenticate an identity of the server by verifying the security key, analyze the security key for a potential cyber security threat, negotiate an encryption key between the system and the server, receive encrypted data from the server, decrypt the encrypted data, perform an integrity check of the decrypted data and transmit the decrypted data to the communication module when no cyber security threat is detected.

The methods and systems disclosed herein may be implemented in any means for achieving various aspects and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

These and other aspects of the present disclosure will now be described in more detail, with reference to the appended drawings showing exemplary embodiments, in which.

Figure 1:
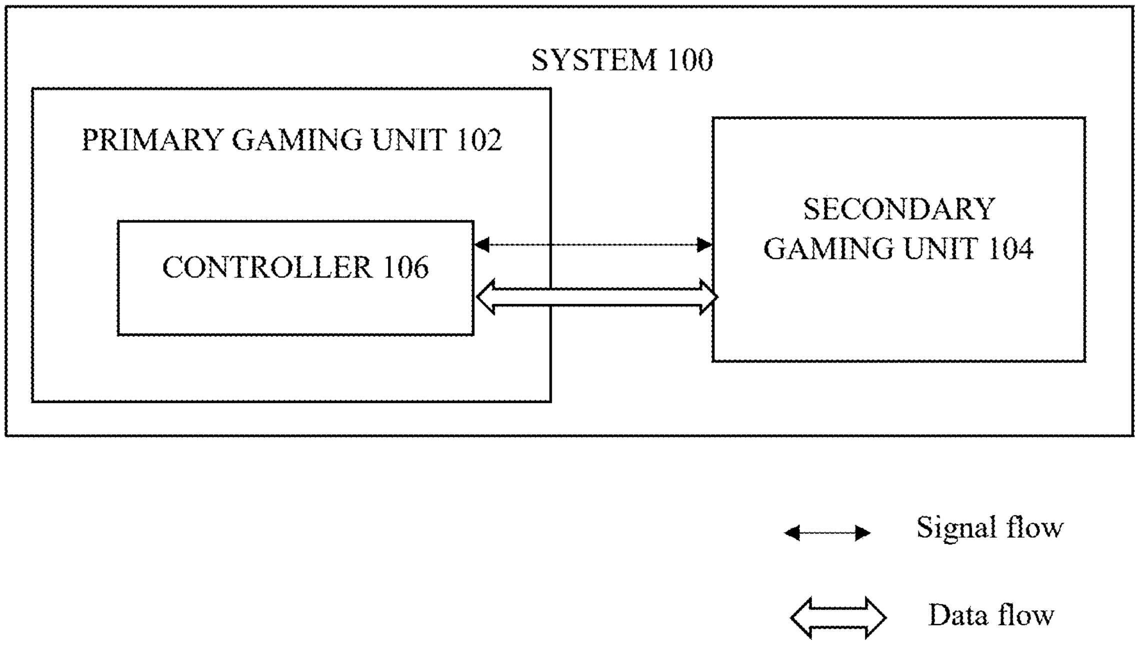
FIG. 1 illustrates a block diagram of the system comprising a primary gaming unit and a secondary gaming unit, according to one or more embodiments.

Other features of the present embodiments will be apparent from the accompanying drawings and from the detailed description that follows.

DETAILED DESCRIPTION

For simplicity and clarity of illustration, the figures illustrate the general manner of construction. The description and figures may omit the descriptions and details of well-known features and techniques to avoid unnecessarily obscuring the present disclosure. The figures exaggerate the dimensions of some of the elements relative to other elements to help improve understanding of embodiments of the present disclosure. The same reference numeral in different figures denotes the same element.

Although the detailed description contains many specifics for the purpose of illustration, a person of ordinary skill in the art will appreciate that many variations and alterations to the details are considered to be included herein.

Accordingly, the embodiments herein are without any loss of generality to, and without imposing limitations upon, any claims set forth. The terminology used herein is for the purpose of describing particular embodiments only and is not limiting. Unless defined otherwise, all technical and scientific terms used herein have the same meaning as commonly understood by one with ordinary skill in the art to which this disclosure belongs.

As used herein, the articles "a" and "an" used herein refer to one or to more than one (i.e., to at least one) of the grammatical object of the article. By way of example, "an element" means one element or more than one element. Moreover, usage of articles "a" and "an" in the subject specification and annexed drawings construe to mean "one or more" unless specified otherwise or clear from context to mean a singular form.

As used herein, the terms "example" and/or "exemplary" mean serving as an example, instance, or illustration. For the avoidance of doubt, such examples do not limit the described subject matter herein. In addition, any aspect or design described herein as an "example" and/or "exemplary" is not necessarily preferred or advantageous over other aspects or designs, nor does it preclude equivalent exemplary structures and techniques known to those of ordinary skill in the art.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein, the terms "left," "right," "front," "back," "top," "bottom," "over," "under" and the like in the description and in the claims, if any, are for descriptive purposes and not necessarily for describing permanent relative positions. The terms so used are interchangeable under appropriate circumstances such that the embodiments of the apparatus, methods, and/or articles of manufacture described herein are, for example, capable of operation in other orientations than those illustrated or otherwise described herein.

No element act, or instruction used herein is critical or essential unless explicitly described as such. Furthermore, the term "set" includes items (e.g., related items, unrelated items, a combination of related items and unrelated items, etc.) and may be interchangeable with "one or more". Where only one item is intended, the term "one" or similar language is used. Also, the terms "has," "have," "having," or the like are open-ended terms. Further, the phrase "based on" means "based, at least in part, on" unless explicitly stated otherwise.

In order to fully understand the scope of the invention, the following terms used herein are hereby defined.

As used herein, the terms "system," "device," "unit," and/or "module" refer to a different component, component portion, or component of the various levels of the order. However, other expressions that achieve the same purpose may replace the terms.

As used herein, the terms "couple," "coupled," "couples," "coupling," and the like refer to connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably," "removable," and the like, near the word "coupled" and the like does not mean that the coupling, etc., in question is or is not removable.

As used herein, the term "or" means an inclusive "or" rather than an exclusive "or." That is, unless specified otherwise, or clear from context, "X employs A or B" means any of the natural inclusive permutations. That is, if X employs A; X employs B; or X employs both A and B, then "X employs A or B" is satisfied under any of the foregoing instances.

The term "comprising", which is synonymous with "including", "containing", or "characterized by" here is defined as being inclusive or open-ended, and does not exclude additional, unrecited elements or method steps, unless the context clearly requires otherwise.

The term "media" is defined as forms of electronically transmitted information, such as audio, video, graphics, and/or text.

The term "device" is defined as an electronic element that cannot be divided without destroying its stated function.

The term "user" includes a person or a computer. The term "user" may also refer to a person who is playing a game or using the gaming system.

The term "communicatively coupled" is defined as devices connected in a way that permits communication.

The term "configured" is defined as arranged within the system to perform certain functions.

The term "receiving" is defined as being given information.

The term "response" is defined as something constituting a reply or a reaction.

The term "based on" is defined as dependent on.

The term "a plurality of" is defined as multiple.

The term "memory" is defined as any device in which information can be stored.

The term "execute" is defined as run or launch.

The term "instructions" is defined as software program or machine executable code.

The term "trigger" is defined as an event, message, or message sequence sufficient to initiate, cause, or task an action.

The term "component" is intended to be broadly construed as hardware, firmware, and/or a combination of hardware and software.

As used herein, the term "tandem" refers to a group of two or more arranged one behind the other or used for acting in conjunction. The word tandem refers to a relationship between two things involving cooperative action (e.g., mutual dependence), etc.

The term "picker" refers to a device for holding an object. The "picker" can be seamlessly and simultaneously maneuvered in both directions to pick an object placed anywhere below in a rack. The "picker" can also be seamlessly and simultaneously maneuvered in both vertical and horizontal directions. The picker can be one of a mechanical operated device, a vacuum operated device, etc. The picker may comprise a claw.

The term "claw" refers to the apparatus used to pick objects, move, and release them. The claw may have one or more fingers, prongs, or grippers to grab the object. The claw may also be a magnet which attracts the object. Claws may also be operated by means of a pneumatic, hydraulic, and vacuum mechanism. Claws may also use other mechanisms to pick, move and release an object. The claw may be manipulated using a joystick or any other means. The claw is used in arcade claw crane games.

The term "physical gaming unit" refers to a device or an environment where the user may interact physically. The user's interaction may involve physical activity. The user's activity may be skill based or non-skill based activity.

The term "digital gaming unit" refers to an electronic device or a digital environment (e.g., virtual environment) where the user may interact virtually or digitally. The digital gaming unit refers to any gaming unit in which any game is played with assistance of computer or other electronic device, online or offline.

The term "digital environment" refers to a communications environment in which digital devices communicate and manage content and activities within it.

As used herein "crane" refers to a single crane that can perform lifting independently. Crane may be any type of crane that can move seamlessly in all directions.

As used herein, the term "gantry" refers to a platform made to carry a traveling crane and supported by towers running on parallel tracks. The gantry supports the picker to maneuver seamlessly in x, y, and z direction. The gantry also supports the picker to move in a vertical direction.

As used herein, the term "arcade game" is a game machine typically found in public places like malls, restaurants, and amusement arcades, and is usually coin operated. Arcade games are usually video games, pinball machines or electromechanical games.

As used herein, the term "augmented reality (AR) environment" refers to a simulated environment in which one or more virtual objects are superimposed over a physical environment, or a representation thereof. The augmented reality environment refers to an amalgam of real-world settings and virtual objects. That is to say, an augmented reality environment refers to a representation of a real-world environment that also includes an overlay of augmented reality elements (e.g., three-dimensional virtual, computer-generated objects) such as, for example, a pickup location marker, a drop-off location marker, or other object. Generally, the overlay of augmented reality elements within an augmented reality environment is seamless—i.e., the augmented reality elements overlaid on the real-world view appear to a user to fit in naturally with the surrounding real-world environment wherever they are placed.

As used herein, the term "augmented reality (AR) environment" are wearable computer-capable glasses that add extra information, ideally 3D images and information such as animations and videos, to the user's real-world scenes by overlaying the computer-generated or digital information on the user's real-world. It can retrieve information from computers, smartphones, or other devices and can support Wi-Fi, Bluetooth, and GPS. Examples include Google Glass Explorer Edition and Vuzix M100.

As used herein, the term "augmented reality headset" combines computer vision and wireless perception to automatically locate a specific item that is hidden from view, perhaps inside a box or under a pile, and then guide the user to retrieve it.

As used herein, the term "virtual reality (VR) environment" refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

As used herein, the term "virtual reality (VR) glasses" refers to a type of eyewear which functions as a display device. Virtual reality (VR) glasses enable the wearer to view a series of computer generated images with which they can then interact. Virtual reality (VR) glasses take the form of one or two display screens which are worn in front of the face and project graphical images, often accompanied by sound and video. The viewer sees two separate images-one in each eye which the brain combines to form a three dimensional image. They show an illusion of depth which is a characteristic feature of virtual environments.

As used herein, the term "virtual reality headset" is a heads-up display (HUD) that allows users to interact with simulated environments and experience a first-person view (FPV). VR headsets replace the user's natural environment with virtual reality content, such as a movie, a game or a prerecorded 360-degree VR environment that allows the user to turn and look around, just as in the physical world.

As used herein, the term "bill" refers to a piece of legal paper money.

As used herein, the term "digital receipts" are a form of receipt issued by merchants, sent directly to your phone or email. Digital receipts are also referred to as electronic receipts or e-receipts. Ultimately, they serve as proof of payment, without the need for a physical paper trail. Digital receipts are generally considered more convenient as they are less likely to be lost, will not fade, and do not require the use of paper.

As used herein the term "game of chance" refers to a game when the outcome of the game is predominantly determined by chance. A "game of chance" is determined mainly by a random factor of any type. In games of chance, the usage of skill is present, but a higher level of chance determines success. Games like playing cards, roulette, rolling a dice, or even picking a numbered ball are reflected upon as chance-based games. It is pertinent to note that players here do not have control over the outcome of the result.

As used herein the term "game of skill" refers to a game when the outcome of the game is predominantly determined by skill. The game of skill is also referred to as a skill based game. A "game of skill" is based mainly on the mental or physical level of expertise of a player, rather than on chance. One of the most significant benefits of a game of skill is that it provides freedom to the players to explore their capabilities in the sport. These games invigorate the players to get accustomed to a certain set of rules while looking for ways to improve and implement different strategies through consistent practice. It is false that the game of skill does not have a chance component, in fact to a certain extent it does. However, it is the individual skills of the player or players that determine the success rate.

As used herein, the term "real-time" refers to operations conducted as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As used herein, the term "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

The term "processor" is defined as a component in the server for executing instructions stored in memory.

The term "physical game" refers to a game which involves physical interaction of a user. The physical game also refers to a game which may involve social and interpersonal skills. The physical game may involve a physical gadget to interact with to play the game. The physical game comprises at least one of a pin ball game, a basketball game, a ball rolling game, a coin pusher game, a coin rolling game, a dance/music arcade game, a claw game, a crane game, a self-contained ball dropping game, a soccer style arcade game, a dart machine game, a pool table game, a hammer game, an air/water gun game, a shooting gallery game, a shuffleboard game, a wheel game, a coin operated pool game, a non-coin operated pool game, a table top physical arcade game, etc.

The term "digital game" refers to a game played using digital technology. A digital game is an electronic stimulation for educational or entertainment purposes. A digital game is any form of electronically mediated game. The digital game may be operated using a digital gadget.

The term "digital gadget" refers to ingenious electronic tools that humans use to perform certain tasks or make life easier or more efficient. The digital gadgets are specialized electronic devices that require a form of electric power to operate.

The term "stand-alone game" refers to a game that is not dependent and can be played independently. The "stand-alone game" also refers to a game that is played without connecting to the internet. The "stand-alone game" is also one that is not dependent on being online in order to play the game. The "stand-alone game" is complete in itself and self-contained. The stand-alone game can be played either online or offline.

As used herein, two or more elements or modules are "integral" or "integrated" if they operate functionally together. Two or more elements are "non-integral" if each element can operate functionally independently.

The term "transceivers" is defined as a component used for both transmission and reception of digital data.

As used herein, the term "network" refers to one or more data links that enable the transport of electronic data between computer systems and/or modules and/or other electronic devices. When a network or another communications connection (either hardwired, wireless, or a combination of hardwired or wireless) transfers or provides information to a computer, the computer properly views the connection as a transmission medium. A general purpose or special purpose computer access transmission media that can include a network and/or data links which carry desired program code in the form of computer-executable instructions or data structures. The scope of computer-readable media includes combinations of the above, that enable the transport of electronic data between computer systems and/or modules and/or other electronic devices.

As used herein, the term "component" broadly construes hardware, firmware, and/or a combination of hardware, firmware, and software.

The term "cyber security" as used herein refers to application of technologies, processes, and controls to protect systems, networks, programs, devices, and data from cyber-attacks.

The term "cyber security module" as used herein refers to a module comprising application of technologies, processes, and controls to protect systems, networks, programs, devices and data from cyber-attacks and threats. It aims to reduce the risk of cyber-attacks and protect against the unauthorized exploitation of systems, networks, and technologies. It includes, but is not limited to, critical infrastructure security, application security, network security, cloud security, Internet of Things (IoT) security.

The term "encrypt" used herein refers to securing digital data using one or more mathematical techniques, along with a password or "key" used to decrypt the information. It refers to converting information or data into a code, especially to prevent unauthorized access. It may also refer to concealing information or data by converting it into a code. It may also be referred to as cipher, code, encipher, encode. A simple example is representing alphabets with numbers-say, 'A' is '01', 'B' is '02', and so on. For example, a message like "HELLO" will be encrypted as "0805121215," and this value will be transmitted over the network to the recipient(s).

The term "decrypt" used herein refers to the process of converting an encrypted message back to its original format. It is generally a reverse process of encryption. It decodes the encrypted information so that only an authorized user can decrypt the data because decryption requires a secret key or password. This term could be used to describe a method of unencrypting the data manually or unencrypting the data using the proper codes or keys.

The term "cyber security threat" used herein refers to any possible malicious attack that seeks to unlawfully access data, disrupt digital operations, or damage information. A malicious act includes but is not limited to damaging data, stealing data, or disrupting digital life in general. Cyber threats include, but are not limited to, malware, spyware, phishing attacks, ransomware, zero-day exploits, trojans, advanced persistent threats, wiper attacks, data manipulation, data destruction, rogue software, malvertising, unpatched software, computer viruses, man-in-the-middle attacks, data breaches, Denial of Service (DOS) attacks, and other attack vectors.

The term "hash value" used herein can be thought of as fingerprints for files. The contents of a file are processed through a cryptographic algorithm, and a unique numerical value, the hash value, is produced that identifies the contents of the file. If the contents are modified in any way, the value of the hash will also change significantly. Example algorithms used to produce hash values: the Message Digest-5 (MD5) algorithm and Secure Hash Algorithm-1 (SHA1).

The term "integrity check" as used herein refers to the checking for accuracy and consistency of system related files, data, etc. It may be performed using checking tools that can detect whether any critical system files have been changed, thus enabling the system administrator to look for unauthorized alteration of the system. For example, data integrity corresponds to the quality of data in the databases and to the level by which users examine data quality, integrity, and reliability. Data integrity checks verify that the data in the database is accurate, and functions as expected within a given application.

The term "alarm" as used herein refers to a trigger when a component in a system or the system fails or does not perform as expected. The system may enter an alarm state when a certain event occurs. An alarm indication signal is a visual signal to indicate the alarm state. For example, when a cyber security threat is detected, a system administrator may be alerted via sound alarm, a message, a glowing LED, a pop-up window, etc. Alarm indication signal may be reported downstream from a detecting device, to prevent adverse situations or cascading effects.

The term "in communication with" as used herein, refers to any coupling, connection, or interaction using electrical signals to exchange information or data, using any system, hardware, software, protocol, or format, regardless of whether the exchange occurs wirelessly or over a wired connection.

As used herein, the term "display" refers to a device with a screen that shows rendered electronic contents (e.g., images, videos, texts, etc.). The display refers to an apparatus that can be deformed to be bent, crooked, folded, or rolled like paper. The display may also refer to an apparatus that is flat and rigid. The display may also comprise a projection unit that projects electronic contents onto an external medium (e.g., screen, wall, object, etc.).

As used herein, the term "cryptographic protocol" is also known as security protocol or encryption protocol. It is an abstract or concrete protocol that performs a security-related function and applies cryptographic methods often as sequences of cryptographic primitives. A protocol describes how the algorithms should be used. A sufficiently detailed protocol includes details about data structures and representations, at which point it can be used to implement multiple, interoperable versions of a program. Cryptographic protocols are widely used for secure application-level data transport. A cryptographic protocol usually incorporates at least some of these aspects: key agreement or establishment, entity authentication, symmetric encryption, and message authentication material construction, secured application-level data transport, non-repudiation methods, secret sharing methods, and secure multi-party computation. Hashing algorithms may be used to verify the integrity of data. Secure Socket Layer (SSL) and Transport Layer Security (TLS), the successor to SSL, are cryptographic protocols that may be used by networking switches to secure data communications over a network.

As used herein, the term "network" may include the Internet, a local area network, a wide area network, or combinations thereof. The network may include one or more networks or communication systems, such as the Internet, the telephone system, satellite networks, cable television networks, and various other private and public networks. In addition, the connections may include wired connections (such as wires, cables, fiber optic lines, etc.), wireless connections, or combinations thereof. Furthermore, although not shown, other computers, systems, devices, and networks may also be connected to the network. Network refers to any set of devices or subsystems connected by links joining (directly or indirectly) a set of terminal nodes sharing resources located on or provided by network nodes. The computers use common communication protocols over digital interconnections to communicate with each other. For example, subsystems may comprise the cloud. Cloud refers to servers that are accessed over the Internet, and the software and databases that run on those servers.

As used herein "Machine learning" refers to algorithms that give a computer the ability to learn without being explicitly programmed, including algorithms that learn from and make predictions about data. Machine learning algorithms include, but are not limited to, decision tree learning, artificial neural networks (ANN) (also referred to herein as a "neural net"), deep learning neural network, support vector machines, rules-based machine learning, random forest, etc. For the purposes of clarity, algorithms such as linear regression or logistic regression can also be used as part of a machine learning process. However, it is understood that using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming. The ANN may be featured with a feedback loop to adjust the system output dynamically as it learns from the new data as it becomes available. In machine learning, backpropagation and feedback loops are used to train the AI/ML model improving the model's accuracy and performance over time.

Other specific forms may embody the present disclosure without departing from its spirit or characteristics. The described embodiments are in all respects illustrative and not restrictive. Therefore, the appended claims rather than the description herein indicate the scope of the invention. All variations which come within the meaning and range of equivalency of the claims are within their scope.

Digital electronic circuitry, software, firmware, or hardware, including the structures disclosed in this specification and their structural equivalents, or in combinations of one or more of them may realize the implementations and all of the functional operations described in this specification. Implementations may be as one or more computer program products i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The actual specialized control hardware or software code used to implement these systems and/or methods is not limiting to the implementations. Thus, any software and any hardware can implement the systems and/or methods based on the description herein without reference to specific software code.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of a digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

To provide for interaction with a user, a computer may have a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices provide for interaction with a user as well. For example, feedback to the user may be any appropriate form of sensory feedback, e.g., visual feedback, auditory feedback, or tactile feedback; and a computer may receive input from the user in any appropriate form, including acoustic, speech, or tactile input.

A computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The computing system may include clients and servers. A client and server are remote from each other and typically interact through a communication network. The relationship of the client and server arises by virtue of computer programs running on the respective computers and having a client-server relationship to each other.

Embodiments may comprise or utilize a special purpose or general purpose computer including computer hardware. Embodiments within the scope of the present disclosure may also include physical and other computer-readable media for carrying or storing computer-executable instructions and/or data structures. Such computer-readable media can be any media accessible by a general purpose or special purpose computer system. Computer-readable media that store computer-executable instructions are physical storage media. Computer-readable media that carry computer-executable instructions are transmission media. Thus, by way of example and not limitation, embodiments can comprise at least two distinct kinds of computer-readable media: physical computer-readable storage media and transmission computer-readable media.

Although the present embodiments described herein are with reference to specific example embodiments it will be evident that various modifications and changes may be made to these embodiments without departing from the broader spirit and scope of the various embodiments. For example, hardware circuitry (e.g., Complementary Metal Oxide Semiconductor (CMOS) based logic circuitry), firmware, software (e.g., embodied in a non-transitory machine-readable medium), or any combination of hardware, firmware, and software may enable and operate the various devices, units, and modules described herein. For example, transistors, logic gates, and electrical circuits (e.g., Application Specific Integrated Circuit (ASIC) and/or Digital Signal Processor (DSP) circuit) may embody the various electrical structures and methods.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a Network Interface Module (NIC), and then eventually transferred to computer system RAM and/or to less volatile computer-readable physical storage media at a computer system. Thus, computer system components that also (or even primarily) utilize transmission media may include computer-readable physical storage media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable subcombination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

Further, a computer system including one or more processors and computer-readable media such as computer memory may practice the methods. In particular, one or more processors execute computer-executable instructions, stored in the computer memory, to perform various functions such as the acts recited in the embodiments.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. Distributed system environments where local and remote computer systems, which are linked (either by hardwired data links, wireless data links, or by a combination of hardwired and wireless data links) through a network, both perform tasks may also practice the invention. In a distributed system environment, program modules may be located in both local and remote memory storage devices.

Example embodiments, as described below, may be used to provide integrated primary gaming and secondary gaming systems. It will be appreciated that the various embodiments discussed herein need not necessarily belong to the same group of embodiments and may be grouped into various other embodiments not explicitly disclosed herein. In the following description, for purposes of explanation, numerous specific details are set forth in order to provide a thorough understanding of the various embodiments.

The foregoing disclosure provides illustration and description but is not intended to be exhaustive or to limit the implementations to the precise form disclosed. Modifications and variations are possible in light of the above disclosure or may be acquired from practice of the implementations.

FIG. 1 illustrates a schematic view of a gaming system 100 comprising a primary gaming unit 102 and a secondary gaming unit 104, according to one or more embodiments. The primary gaming unit 102 is integrated with the secondary gaming unit 104 through the integrated gaming controller. The primary gaming unit comprises a physical gaming unit. The primary gaming unit 102 provides a primary game (e.g., arcade game, crane game, claw game, physical game, etc.) to a user in which the user's physical interaction is needed to execute the game. The primary game may be a physical game. In an embodiment, the user can operate the primary gaming unit 102 and play the primary game from a remote place. In another embodiment, the gaming system 100 comprises an artificial intelligence engine that may assist the user to play and win the game (e.g., primary game, secondary game, etc.). The primary game comprises at least one of a game of skill and a game of chance. The artificial intelligence engine may provide recommendations, suggestions, or hints to the user to play the game and earn more rewards. The secondary gaming unit 104 provides a secondary game (e.g., cup shuffle game, card game, online game, video game, digital game, stand-alone game, client-server game, etc.) in which the user can play the secondary game. The secondary game may be a digital game. The artificial intelligence engine may also assist the user to play and win the secondary game. The secondary game comprises at least one of a game of skill and a game of chance. In an embodiment, the primary gaming unit comprises a plurality of primary gaming cabinets synchronized with each other towards an objective.

The primary gaming unit 102 includes at least one microprocessor or controller 106 for controlling the gaming machine, including receiving player input, and sending output signals for controlling the various components of the primary gaming unit 102 and the secondary gaming unit 104, such as peripheral devices of the machine. The controller 106 may be arranged to receive information regarding instructions provided by a player to primary gaming unit 102 and the secondary gaming unit 104, receive input such as when a button is depressed (which could correspondingly reduce the credit balance), and receive other inputs from a player. The controller 106 may be arranged to generate information regarding a game, such as generating game information for display by at least one display device 202 (such as information comprising game information such as slot symbols, playing cards, bingo cards, bingo balls, etc., depending upon the game being presented), for determining winning or losing game outcomes and for displaying information regarding awards for winning game outcomes, among other things.

The controller 106 may be configured to execute machine readable code or "software" or otherwise process information, such as obtained from a remote server. A first set of game software or other instructions may be stored in memory (such as a data storage device, not shown), e.g., in a fixed or non-transitory configuration, such as for use in implementing the wagering/casino-style game. The memory may also store other information or data, such as data stored in tables or other forms (including, but not limited to look-up tables, pay tables and other information including tracked game play information). The primary gaming unit 102 may also include one or more random number generators for generating random numbers (such as implemented by a random number generator software module stored in the memory and executable by the controller 106), such as for use in presenting the game in a random fashion (e.g., whereby the game is presented in a manner in which the player cannot control the outcome) or pseudo-random fashion (e.g., such as where the game includes a skill component which can affect the outcome of the game). As indicated above, the machine readable code may be configured in various manners, such as by having various "modules" of software which are designed to implement specific features of the game play or game presentation. In one embodiment, as illustrated, the controller 106 may execute software that implements an operating system, such as Microsoft® Windows®, Linux, etc. The first set of game software may then be executed relative to that operating environment.

The secondary gaming unit 104 comprises a digital gaming unit. In an embodiment, the secondary gaming unit 104 comprises a second physical gaming unit. In an embodiment, the secondary gaming unit 104 comprises a processing circuitry. The processing circuitry is configured to receive an activation signal from the primary gaming unit 102. The primary gaming unit 102 communicates the activation signal to the secondary gaming unit 104 when the primary gaming unit determines that the user has won the secondary game. The primary gaming unit 102 may also communicate the activation signal to the secondary gaming unit 104 in order to provide a chance to the user to play the secondary game when the user has not won the primary game. The processing circuitry activates the secondary game upon receiving the activation signal. The processing circuitry further activates the secondary game in response to a user input received through an input interface. The first output of the primary game is in tandem to a second output of the secondary game. The secondary game comprises one of an online game and a standalone game.

In an embodiment, the gaming system 100 enables multiple users to play the games towards a common objective. The gaming system 100 provides a collaborative aspect and immersive experience to the users by enabling multiple users to play the games and achieve the common goal. In another embodiment, the gaming system 100 enables synchronization of multiple primary gaming units (e.g., physical gaming cabinets, digital gaming cabinets, etc.). The gaming system 100 enables synchronization of multiple primary gaming units (e.g., physical gaming cabinets, digital gaming cabinets, etc.) towards a common objective. In an embodiment, the gaming system 100 comprises an automated prize redemption kiosk that comprises a housing containing a reward, a dispenser controller, and a reward dispenser. The dispenser controller is configured to receive information regarding the reward associated with the user and to cause the reward dispenser to dispense the reward. The reward dispenser dispenses at least one of a gift, a token, cash, a coin, and a ticket to the user based on the first output of the primary game. In an embodiment, the reward dispenser comprises a sensor (e.g., infrared sensor, RFID readers, weight sensor, etc.) that detects that the reward has been dispensed and passed out of the reward dispenser. The infrared sensor projects an infrared signal and when the object (e.g., reward) hits/obstructs the infrared signal, the infrared sensor communicates a signal to the controller ensuring dispersion and/or redemption of the reward. In one embodiment, the collection of sensors monitors each functionality of the gaming units and communicates a signal to the controller to depict hint, suggestions, score, game outputs, etc. on to the display.

In an embodiment, the system comprises an automated prize redemption kiosk. The automated prize redemption kiosk includes a ticket/currency acceptance device; a card reader/writer/dispensing device(s); an input/output display device; a central processing unit; and a currency dispenser including bill and coin dispensing devices. Each of these devices is preferably housed in a secure cabinet or safe with an alarm, and connected to the integrated gaming controller, which in turn is connected to a central office and/or a financial services provider via one or more external port(s).

Those skilled in the art will appreciate that the hardware components which make up the kiosk are, in general, commercially available devices, and that a variety of equivalent devices may be substituted for the specific devices described herein. The software that coordinates and controls the various devices is not commercially available and will be described below, although individual commercially available subroutines or drivers may be included in the software.

The apparatus may optionally include a biometric reader for receiving a biometric identifier, such as a fingerprint, to verify the identity of a card holder. Upon input of the biometric data, the kiosk either compares the input biometric data with corresponding data stored on the card, with data stored in an internal database, and/or with data stored in a central database, and then authorizes further transactions if verified, or terminates the transaction and/or alert security if not verified.

The kiosk further includes a communications interface (not shown), which may be a LAN interface, a TCP/IP connection to the Internet, a wireless communications system, direct wired connections to a banking system, or any other communications interface capable of transmitting and receiving data from a central accounting system, banking services provider, security/monitoring service, hotel reservations system, encryption or authentication key server, biometrics database server, and so forth depending on the services to be provided, as well as internal buses for carrying data and control signals for the various components of the kiosk.

Additional functions not described in detail herein include, but are not limited to, interactive messaging, streaming and/or snapshot video surveillance (in which cameras are tied to system functions to capture video of system use or system services), and display of the user interface in multiple languages. In addition, the integrated gaming controller preferably generates records of all transactions or actions performed by the kiosk for use as an audit trail, stores the records internally and/or transmits the records to a central accounting system. If the system is capable of snapshot video surveillance, pictures may be added to a transaction log, as part of the audit trail.

The automated prize redemption kiosk may redeem player points recorded in the player's account, by offering gifts and printing gift coupons based on the verified point amount and player selections input through the touch screen display, and by sending acknowledgment back to the accounting or loyalty card management system. Optionally, the kiosk of the invention may be adapted to provide various automated teller machine (ATM) functions such as cash advances from a bank account or credit card, either by dispensing the cash directly or printing a receipt/voucher with the desired amount. The procedure may be identical to that employed by a conventional ATM, with verification of an ATM, debit, or credit card inserted into the card reader/writer being carried out by a financial services provider via a direct or secured TCP/IP connection. Since ATM functions are well-known, they will not be described in detail herein.

In another embodiment, the system comprises an artificial intelligence engine. The artificial intelligence engine is configured to perform analysis of a behavior of the user through a user input; perform analysis of a previous execution of the secondary game in response to the user input; and generate at least one of a suggestion, a recommendation, and a hint based on the analysis of the behavior of at least one of the user and the analysis of the previous execution of the secondary game. The artificial intelligence engine is also configured to perform analysis of a behavior of the user through a user input; perform analysis of a previous execution of the primary game in response to the user input; and generate at least one of a suggestion, a recommendation, and a hint (e.g., feedback) based on the analysis of the behavior of at least one of the user and the analysis of the previous execution of the primary game. The artificial intelligence engine analyzes the behavior of the user by analyzing a pattern of the user input. The artificial intelligence engine learns continuously from a play of the user, and a behavior of the user to generate a recommendation, a hint, and a suggestion to enhance the play that is ongoing of the primary game and the secondary game. The artificial intelligence engine further improves the play in future by learning from the play of a player, and the behavior of the player.

The gaming system 100 comprises a card reader that reads an identity card associated with the user and verifies an identity of the user. In an embodiment, the gaming system 100 enables multiple users to play the primary game and the secondary game. The card reader comprises a slot and a read head. The read head reads information associated with the identity card of the user when the identity card is swiped through the slot.

In one embodiment, the integrated gaming controller is configured to start a first play in the primary game through the primary gaming unit. The integrated gaming controller determines a first output of the primary game. The integrated gaming controller may determine the first output of the primary game through a sensor. The sensor may be array of sensors that may determine whether the projectile has hit/pass through the target and determines the first output of the game. The primary game may be executed based on the user's interaction with the primary gaming unit. The integrated gaming controller monitors' the user's inputs and determines a pattern of the user's inputs which involves classification and cluster of patterns. The integrated gaming controller then determines the user behavior based on the user pattern. The integrated gaming controller then determines the proficiency level based on the user behavior and the pattern of the user input. The integrated gaming controller then provides a command to the secondary gaming unit to choose and provide the secondary game with a predefined risk level in accordance to the proficiency level of the user. In one embodiment, the integrated gaming controller may choose the secondary game among the secondary games available in accordance to the proficiency level of the user. The secondary game may have one or more risk levels associated with the secondary game. The integrated gaming controller may provide the appropriate secondary game with appropriate risk level based on the proficiency level of the user, thus providing enhanced gaming experience to the user. The integrated gaming controller may use artificial intelligence in determining the proficiency level of the user. The integrated gaming controller may use algorithms such as statistical algorithms, structural algorithms, Neural network-based algorithms (e.g., Feed-Forward Backpropagation neural network (FFBPNN), hybrid algorithms, template matching algorithm, Fuzzy-based algorithm, etc. For example, the integrated gaming controller, in patten matching, may use algorithms such as k-nearest neighbors, decision trees, random forests, support vector machines, Naive Bayes classifier, Kernel estimation and K-nearest-neighbor algorithms, gene expression programming, and neural networks. For example, the integrated gaming controller, in clustering, may use algorithms such as deep learning methods, categorical mixture models, K-means clustering, Hierarchical clustering, Correlation clustering, Kernel principal component analysis (Kernel PCA), T-distributed Stochastic Neighbor Embedding (TSNE), etc.

Figure 2A:
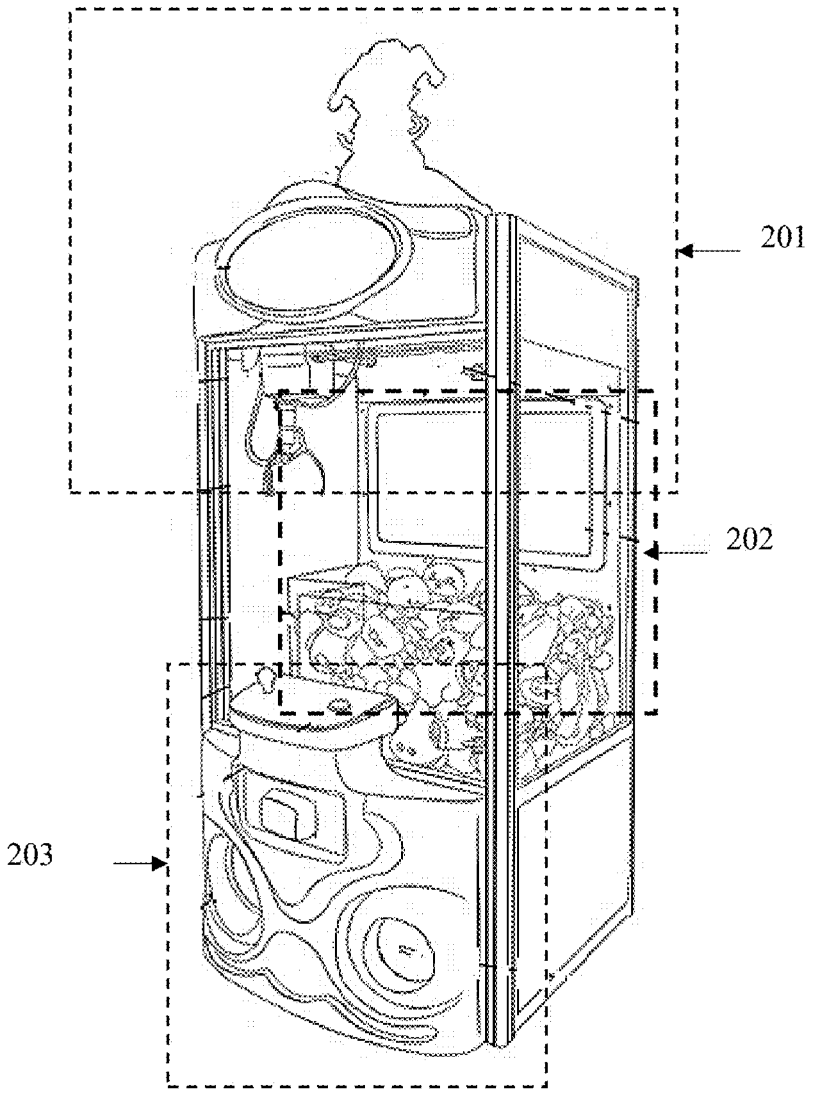
FIG. 2A illustrates a perspective view of a primary gaming unit, according to one or more embodiments.
Figure 2B:
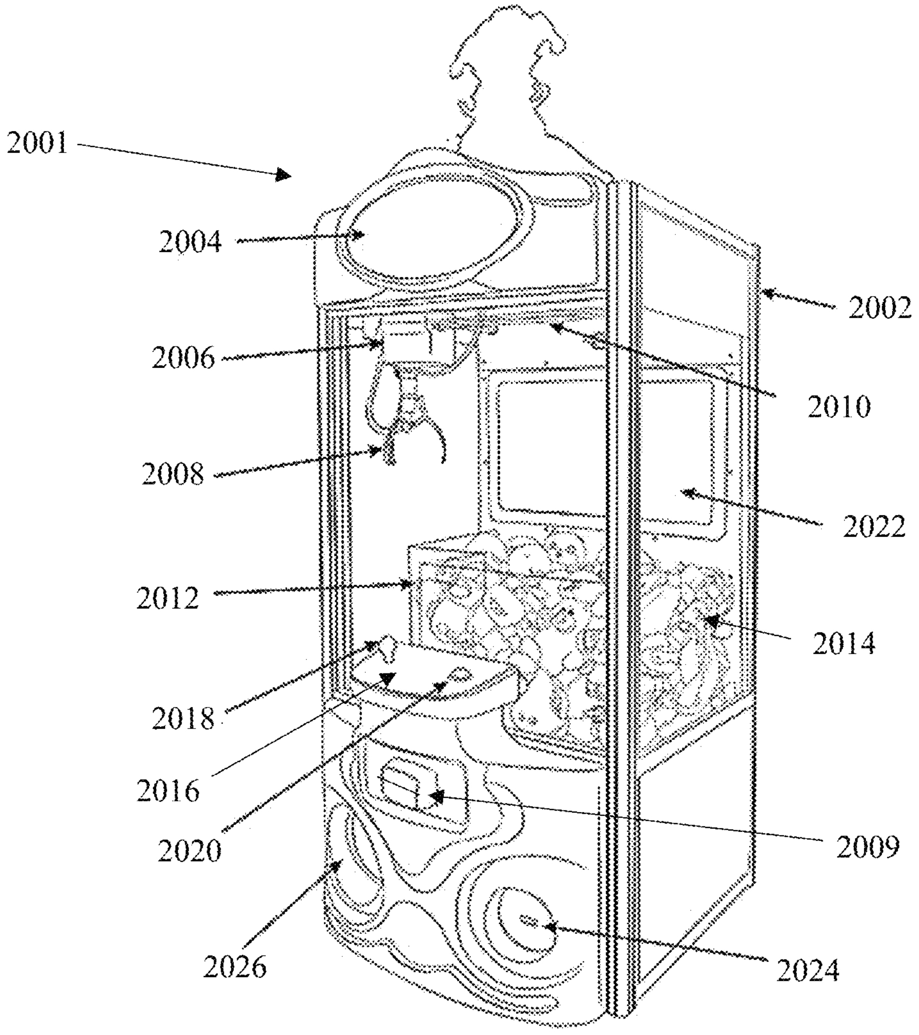
FIG. 2B illustrates a perspective view of a primary gaming unit comprising all the components of the primary gaming unit, according to one or more embodiments.
Figure 2C:
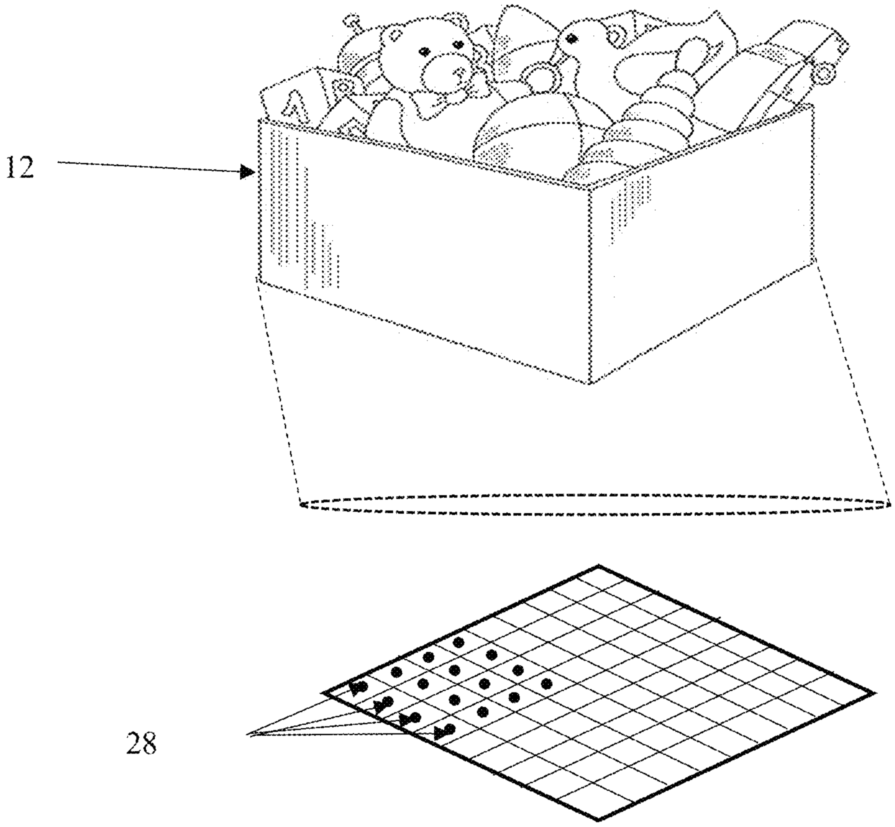
FIG. 2C illustrates a perspective view of a rack and a collection of sensors placed below the rack, according to one or more embodiments.

FIG. 2A and FIG. 2B illustrates a schematic view of a primary gaming unit, according to one or more embodiments. The primary gaming unit provides a primary game to a user. The primary gaming unit 2001 comprises a frame 2002. The frame 2002 is divided into three areas for understanding purposes. The frame comprises a first area 201, a second area 202 and a third area 203. The first area 201 as shown in FIG. 2B comprises a X-Y linear guide 20210, a crane 2006 and a claw 2008 attached to the crane 2006. The crane 2006 is supported by a gantry (not shown). The second area 202 comprises a display device 2022, a rack 2012 and object 2014 inside the rack 2012. The third area 203 may comprise an input device 2016, a joystick 2018, a button 2020, a prize door 2026 and a ticket dispenser 2024. The object 2014 may be a reward.

In accordance with one embodiment of the invention, the primary gaming unit 2001 provides a primary game that comprises one or more non-casino type games. The non-casino type games may comprise games which are traditionally not casino-type games, such as games or events which are traditionally amusement-type games or skill games, or games having amusement-type game components, such as games where the outcome is determined substantially by skill (referred to herein generally as an "amusement" or "amusement-style" event or game). In an embodiment, the primary gaming unit may have one or more traditional casino-style wagering games (casino-style games where the outcomes of the games are determined primarily by chance and not skill; referred to herein generally as the "casino game(s)").

The system includes at least one display device 2022. The display device 2022 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g., 4:3, widescreen or the like). The display device 2022 may be capable of projecting or displaying a wide variety of information, including images, symbols and other indicia or information associated with game play, game promotion or other events. As illustrated in FIG. 2, the display device 2022 might comprise a single flat panel display. The display device 2022 might have other configurations, such as being a curved display (in this case, curved about its vertical axis). In an embodiment, the system might include more than one display device.

The system preferably includes one or more input devices 2016 to enable a player to play a primary game and a secondary game (such as input buttons, plunger mechanisms, a touch-screen display, joystick, touchpad, or the like). These one or more input devices 2016 may be utilized by the player to facilitate a first play, such as by providing input or command to the primary gaming unit 2001. In one embodiment, a touch screen may be associated with the input device 2016 of the primary gaming unit 2001.

The primary gaming unit 2001 may be configured to generate and present games in a stand-alone manner or it may be in communication with one or more external devices or systems at one or more times. The primary gaming unit 2001 might communicate with one or more of such external devices or systems via one or more communication ports or other interface devices. These ports or interface devices may be configured to implement various communication protocols (including proprietary protocols) and communicate via wireless, wired or other communication link. For example, the primary gaming unit 2001 may be configured as a server based device and obtain game code or game outcome information from a remote game server (in which event the gaming machine controller may receive game information from the server, such as game outcome information, and use that server-generated information to present the game at the gaming machine). As one example, when the primary gaming unit 2001 is configured to present a multi-player bingo game, primary gaming unit 2001 may communicate with one or more game servers to obtain information regarding a purchased bingo card, selected or drawn bingo balls, and to confirm game outcomes, such as interim pattern matches, or game-ending pattern matches of the drawn bingo balls to the game indicia associated with a bingo card assigned to the player.

As indicated, the primary gaming unit 2001 is configured to authenticate an identity of the user and allow a player that has purchased a ticket or a token to play a game. The primary gaming unit 2001 is preferably configured to accept value, such as in the form of coins, tokens, paper currency or other elements or devices representing value such as monetary funds. Thus, as indicated above, the primary gaming unit preferably includes a mechanism or means for accepting monetary value. For example, the primary gaming unit might include a coin acceptor for accepting coins. Of course, associated coin reading/verifying devices and coin storage devices may be associated with the primary gaming unit if it is configured to accept coins. The primary gaming unit 2001 might include a scanner. Such a scanner may be configured to accept and read/verify paper currency and/or other media such as tickets. Of course, in such an event the primary gaming unit 2001 may further be configured with one or more paper currency or ticket storage devices, such as cash boxes, and other paper currency or media handling devices (including transport devices).

The primary gaming unit 2001 might also be configured to read magnetic stripe cards or other media having data associated therewith and via which value or funds may be associated with the primary gaming unit 2001. The mechanism for accepting monetary value might also comprise hardware and/or software which allows a player to transfer (such as electronically) funds from an account, or a bank or other financial institution account. Such a mechanism might include a communication interface which permits the gaming machine to communicate with a mobile phone, PDA, tablet, or other electronic device of the player (such as via a physical interface or wired or wireless communications), such as to enable the transfer of funds from the player to the gaming machine or system.

When the player associates funds with the primary gaming unit 2001 or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits, such as to purchase one or more games or game cards (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiments, the player might select a "play game" input, such as by pressing a "spin" button, which is taken to comprise both a command to place a wager (such as of a preset or pre-selected number of credits) and to start the game. Of course, other configurations may be implemented for accepting monetary value from the player and for allowing the player to place a wager from the associated monetary value.

In one embodiment, the primary gaming unit 2001 is configured to award winnings for one or more winning wagering game outcomes. Such winnings may be represented as credits, points, or the like. In one embodiment, the player may "cash out" and thus remove previously associated funds and any awarded winnings or such may otherwise be paid to the player. These winnings may be associated with the player's credit balance, thus increasing the player's credit balance.

The system may also include a player tracking device, such as a card reader and/or an associated keypad or other input device (such as a touch screen display). Such player tracking devices are well known and may permit the game operator to track play of players of the primary gaming unit 2001. The tracked play may be utilized to offer player bonuses or awards.

In one embodiment, one or more of the input devices 2016 are utilized to facilitate play of the amusement-style event. These input devices 2016 may comprise one or more of the input devices which are used to present the casino-style wagering game but may also comprise one or more different input devices. As described below, in two exemplary embodiments, the amusement-style events may comprise a crane event or a coin-pusher event. In the crane event, a player attempts to guide a crane or claw to a position and then use the crane or claw to pick an object, such as a prize. In the coin-pusher event, the player attempts to guide a coin onto a location of a coin platform such that a moving coin pusher pushes one or more coins off the platform. In the case of the crane event, the player input devices may thus comprise a crane control such as a joystick 2018 and a button 2020 (sec FIG. 2B) which communicate player inputs to the controller, which then generates corresponding control commands (which may control one or more motors or the like for changing the location of the crane, dropping a claw of the crane, closing a bucket or claw of the crane, etc.). In the case of the coin-pusher event, the player input device might comprise a movable coin launcher which enables a player to direct a coin to a desired location by rolling the coin down a slot of a guiding device. Such a launcher may comprise a guide which is mechanically mounted to the primary gaming unit 2001. Of course, the amusement-style event might comprise any number of other events now known or later developed, and might comprise pinball type events, Pachinko type events, skee-ball, shooting or target events, scoop crane type events, or others.

The primary gaming unit 2001 further comprises one or more amusement-style event presentation elements. In one embodiment, the primary gaming unit 2001 may be configured to present a crane amusement event. In this configuration, one or more crane elements are preferably located in the upper area 2004 of FIG. 2B. Inside the gaming system (see FIG. 2B) may be located a crane 2006 and a rack 2012 containing one or more objects (e.g., prizes) 2014. The crane 2006 may comprise a claw 2008 which is located above the objects 2014. Play or presentation of the crane event is described in more detail below. Prizes might be located in the rack 2012 in various ways, including by being piled or stacked on a base of the rack 2012, or by being located on a stand or rotating platform in the rack 2012.

Figure 2D:
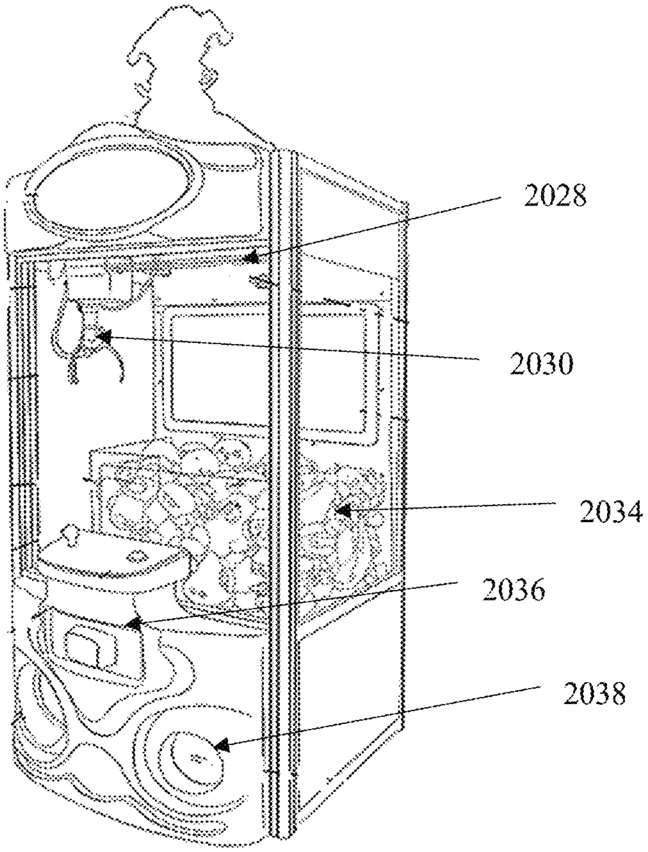
FIG. 2D illustrates a perspective view of a primary gaming unit comprising all the sensors of the primary gaming unit, according to one or more embodiments.

The primary gaming unit 2001 receives a command to move the picker through an input device. The command received is through at least one of the joystick, the button, the arrow keys, the keypad, and the touchpad from the input device 2016. The picker is moved by the command from the input device, in an x-direction and a y direction according to the command and to move the picker in a downward direction to pick the object. The picker comprises a crane and a claw. The crane is supported by a gantry which moves the crane in the x-direction, y direction, and downward direction. The picker, when moved downward, tries to catch the object through the claw. A command is given through the input device to close the claw to pick the object from the rack. The claw is either able to pick the object or it fails to pick the object. The primary gaming unit comprises the collection of sensors as shown in FIG. 2D. In an embodiment, the collection of sensors comprises sensors that are placed outside of the rack. In an embodiment, the claw may comprise a sensor. The sensor within the claw is used to detect movement, direction, and position of the claw. In another embodiment, the claw may comprise a sensor (e.g., weight sensors, optical sensor, RFID sensor, light sensors, etc.) used for providing a random ripping mechanism to the claw to pick up and hold the object. The primary gaming unit also comprises position sensors 2028 along its gantry rail (e.g., x, y, and z direction). The position sensors 2028 placed along its gantry rail detects the movement of the claw and stops the claw from moving beyond the position of the sensor. The weight sensor 2030 within the claw may determine the weight of the object and communicate a signal to tighten or loosen the gripping to pick up and hold the object firmly. The weight sensor 2030 within the claw is configured to determine whether the claw has picked up the object. In an embodiment, the RFID sensor within the claw reads the RFID associated with the object and ensures via the claw sensor that it has picked up the correct corresponding object. The RFID sensor then communicates a signal to the controller ensuring confirmation that the claw has picked up the right object. In another embodiment, an RFID tag 2034 may be associated with the object that enables the RFID reader to read the RFID tag 2034. The collection of sensors comprises a collection (e.g., an array) of infrared proximity sensors, RFID readers, and weight sensor. In an embodiment, the object comprises a RFID tag 2034. In the case where an object is picked by the claw, the RFID reader fails to read the RFID tag 2034 in the rack, and the RFID reader in the claw reads the RFID tag 2034 on the object, the output is set as true, signifying a primary reward, and the primary game is ended. The primary reward comprises one of a token, a ticket, a printed receipt, a point, a playing chance, a digital receipt, and a gift. In case the picker fails to pick the object, the first output of the primary gaming unit is set as false. In case the first output of the primary game is set as false, the controller is adapted to turn on a secondary game on the display device.

The secondary gaming unit comprises a user authentication unit to verify an identity of the user. A processing circuitry is configured to receive an activation signal from the primary gaming unit when the first output of the primary game is set as true, and to activate the secondary game upon receiving the activation signal. In an embodiment, the system may comprise a contact image sensor 2038 at the ticket dispenser to scan the ticket and validate the ticket. The Contact image sensors (CIS) are image sensors used in scanners almost in direct contact with the ticket to be scanned. Charge-coupled devices (CCDs), the other kind of sensor often used in scanners, use mirrors to bounce light to a stationary sensor. The CIS works by shining light at an image, document, or object. In simple terms, the reflected light is then directed onto photosensitive technology via mirrors and lenses, then converted into electronic data that is used to form a digital copy of the original. By using the CIS, the system ensures the ticket is dispensed. The CIS may also ensure that the ticket is dispensed, and the intended player is collecting the ticket. In another embodiment, the system comprises IR sensor 2036 at the reward dispenser. The IR sensor 2036 detects the motion of the object (e.g., rewards) into the collection tray and communicates a signal to the controller that the object is dispensed.

In another embodiment, the primary gaming unit may be configured to present a coin-pusher amusement event. In this configuration, one or more coin pusher elements are preferably located in the second area 202 of the primary gaming unit 2001. Inside of the second area 202 may be located a platform having an edge or drop off, one or more coins on the platform, and a moving pusher device which may move towards and away from the edge of the platform, whereby if a sufficient number of coins are located between the pusher and the edge of the platform, when the pusher is moved towards the edge of the platform, one or more coins fall off the edge.

In an embodiment, the primary gaming unit further comprises a remote control signal reception unit. The remote control signal reception unit receives at least one of a first virtual control signal and a second virtual control signal from a remote environment. The remote environment comprises one of an augmented reality environment, a virtual reality environment and a mixed reality environment. The remote environment generates a virtual model of the primary gaming unit. In an embodiment, the virtual model comprises a virtual representation of the primary gaming unit and a virtual user interface object at a respective location in the virtual representation of the primary gaming unit. The virtual model comprises a virtual three-dimensional model. The virtual model receives an input through at least one of the virtual representation of the primary gaming unit and the virtual user interface object in the virtual representation. The virtual model communicates at least one of a first virtual control signal and a second virtual control signal to a remote control signal reception unit in response to the input.

In an embodiment, the controller is further configured to receive a fourth command to maneuver the picker seamlessly and simultaneously in at least one of the x direction and the y direction and position the picker and move the picker downward in response to the first virtual control signal, and receive a fifth command to close the claw in order to pick or grasp the object in response to the second virtual control signal. The user may operate the primary gaming unit from a remote place. The system enables the user to operate the primary gaming unit and get entertained from the remote place (which is useful during pandemics, e.g., COVID). In an embodiment, the remote environment comprises at least one of an augmented reality headset, augmented reality glasses, a virtual reality headset, virtual reality glasses, and a remote control.

The primary gaming unit 2001 further comprises the display device 2022. The display device 2022 is adapted to depict scores won by the user. The display device 2022 is further adapted to provide hints or recommendations to the user while the user is playing the game. The display device 2022 is integrated with the primary gaming unit and a secondary gaming unit. The primary gaming unit further comprises the card reader 2009 and the ticket dispenser 2024. The card reader 2009 is configured to verify an identity of the user. The user may hold a card that holds the identity information of the user. The card reader 2009 reads the card associated with the user and verifies the identity of the user. The card reader 2009 is communicatively coupled to the ticket dispenser 2024. The ticket dispenser 2024 dispenses the ticket to the user. In an embodiment, the ticket dispenser 2024 is communicatively coupled to the collection of sensors 28 (shown in FIG. 2C). The collection of sensors communicates a first signal to the ticket dispenser 2024 upon determining that the object 2014 is picked from the rack 2012. The ticket dispenser 2024, upon receiving the signal from the collection of sensors 28, may dispense tickets to the user.

Figure 2E:
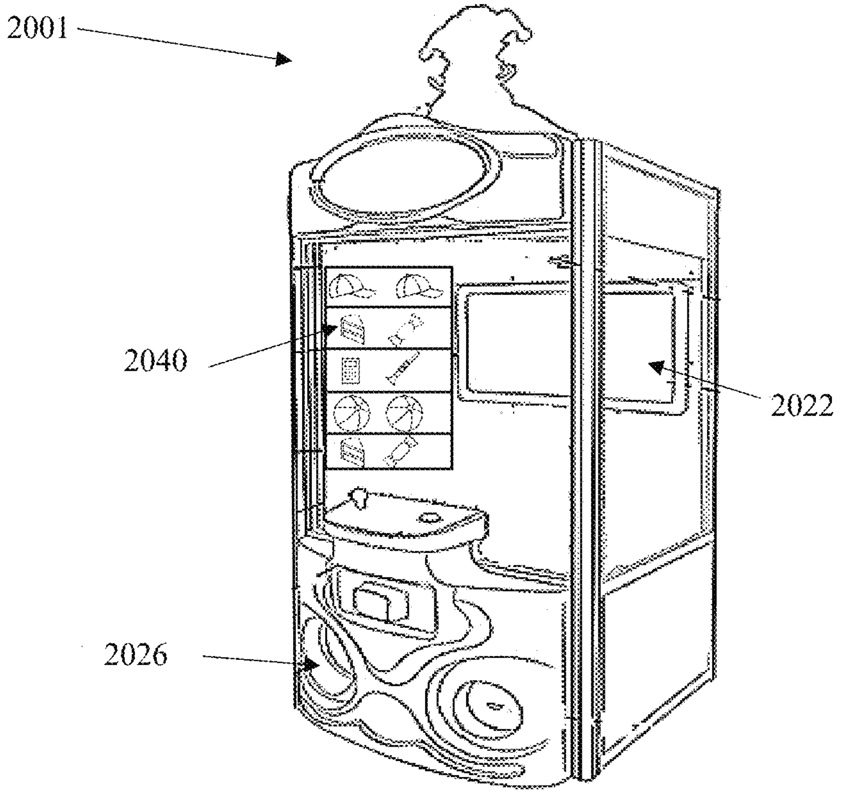
FIG. 2E illustrates a perspective view of a primary gaming unit comprising an automated prize redemption kiosk, according to one or more embodiments.

FIG. 2E illustrates a perspective view of a system comprising an automated prize redemption kiosk, according to one or more embodiments. The system comprises the automated prize redemption kiosk in connection with at least one of the primary gaming unit and the second gaming unit. The integrated gaming controller instructs the automated prize redemption kiosk to dispense the prize to the user when redeemed.

The automated prize redemption kiosk comprises a housing 2040, a prize door 2026, and a display device 2022. The automated prize redemption kiosk further comprises a credential validator. The credential validator may validate the credential provided by the user. The credential may be a bill, cash, a currency, a prepaid card, an electronic card, a smart card, a digital receipt, a printed receipt, etc. The housing 2040 comprises one or more prizes, rewards, etc. arranged. The credential validator upon validating the credential may instruct the dispenser controller and the reward dispenser to dispense the prize meant for redemption. The dispenser controller may comprise an artificial intelligence engine.

The artificial intelligence engine may analyze the behavior of the player and the credential, and instruct the dispenser controller to pick up the prize based on the analysis. The dispenser controller then communicates instructions to the reward dispenser to dispense the prize. The reward dispenser picks up the prize from the designated position within the housing and dispenses the prize upon redemption done using the valid credential.

Figure 3:
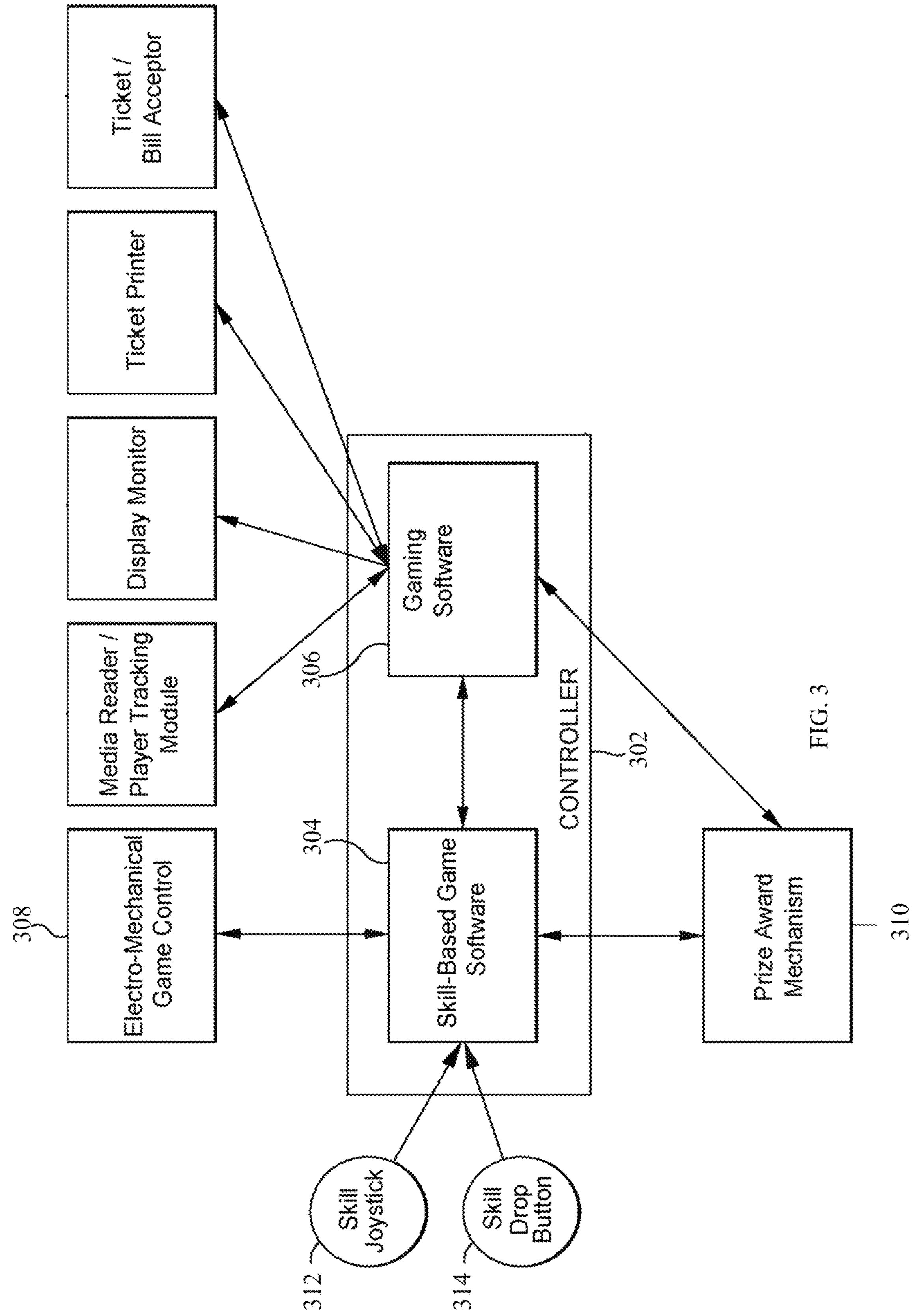
FIG. 3 illustrates a block diagram of a configuration of software features of the system, according to one or more embodiments.

As illustrated in FIG. 3, the primary gaming unit may again comprise software for use in implementing the amusement-style event. For example, the primary gaming unit may include a second set of game software 304, such as amusement event software, which may be stored in one or more memory devices and executed by the controller 302, such as within the operating environment. As illustrated, the primary gaming unit software and the secondary gaming unit software communicate. Further, the controller 302 may execute the amusement game software 306 for use in controlling aspects of the amusement portions of the primary gaming unit, such as the crane control 308, a prize award mechanism 310 or the like. In one embodiment, the amusement event player input devices, such as the crane joystick 312 and button 314, may be controlled by/linked to the second set of game software 304, but in other embodiments, it could be controlled by or linked to the amusement game software 306. In some embodiments, the crane or claw might include a light beam emitter for emitting a beam downwardly into the prize area and/or a camera (such as to provide an overhead view of the claw relative to the prize area), and such elements may be controlled by the controller 302.

In a preferred embodiment, the primary gaming unit 2001 has one or more of the input devices 2016 located at the front (see FIG. 2B), such as at a console or deck. As indicated, the second area 202 (see FIG. 2A) is preferably wholly or partially enclosed by one or more substantially transparent panels. This allows players and third parties to see into the second area 202, such as from the sides and front.

Figure 4A:
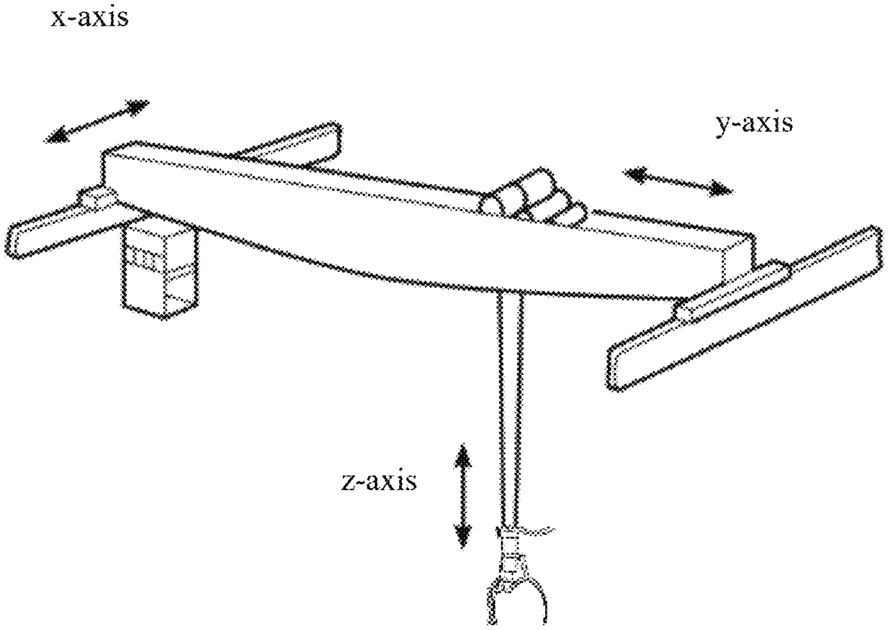
FIG. 4A illustrates the mobility of a picker of a primary gaming unit, according to one or more embodiments.
Figure 4B:
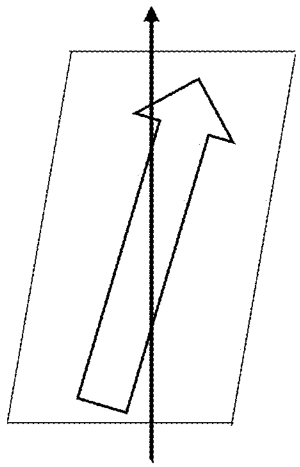
FIG. 4B & FIG. 4C illustrates the mobility of a picker in the same plane, according to one or more embodiments.
Figure 4C:
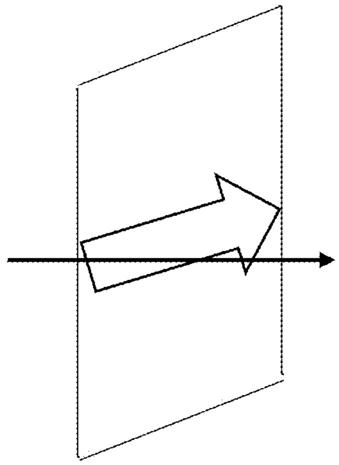
Figure 5:
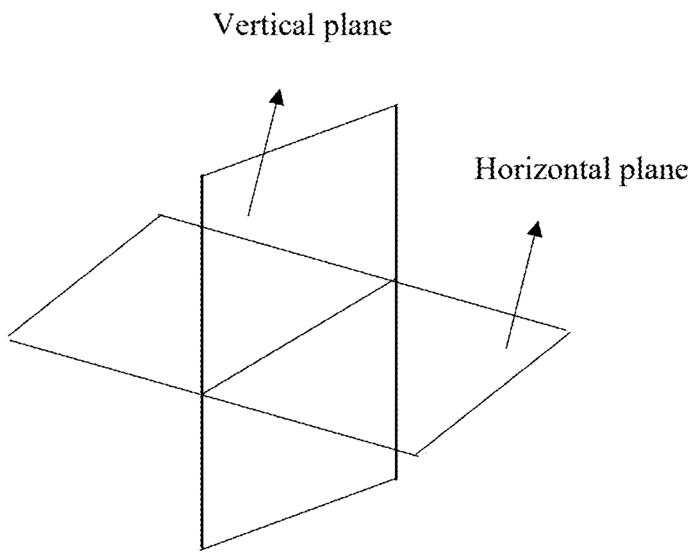
FIG. 5 illustrates the mobility of a picker in two different planes, according to one or more embodiments.

FIG. 4A illustrates the mobility of a picker of a primary gaming unit, according to one or more embodiments. The picker may be supported by a gantry. The gantry may be a movable gantry. The picker may be a crane. The picker can be adapted to move in at least one of an x direction, a y direction, and a downward direction. The picker is operated by a user via an input device that may comprise the joystick, the button, the arrow keys, the keypad, and the touchpad from the input device. The x direction is perpendicular to the y direction in the same plane (e.g., horizontal plane). In an embodiment, the x direction represents x-axis, and the y direction represents y-axis. The picker can also move in the z-axis (height wise) to move in a downward direction to pick the object. In another embodiment, the x direction in a first plane (e.g., horizontal plane) is perpendicular to the y direction in a second plane (e.g., vertical plane). The picker may also operate in both horizontal direction and vertical direction. FIG. 4B & FIG. 4C illustrate the mobility of a picker in the same plane, according to one or more embodiments. The picker is operated by a user via an input device in different directions in the same plane. FIG. 5 illustrates the mobility of a picker in two different planes, according to one or more embodiments. In this embodiment, the picker is operated by a user via an input device in two directions (e.g., perpendicular directions).

The user may operate the joystick to maneuver the picker. The controller receives inputs from the joystick and operates the picker in accordance with the joystick commands. The controller is adapted to maneuver the picker seamlessly and simultaneously in at least one of the x direction and the y direction and position the picker over a rack containing one or more objects. The button is adapted to close the claw enabling the picker to pick an object from the rack. The user may need to utilize his/her skill to maneuver the picker and pick an object from the rack.

Figure 6:
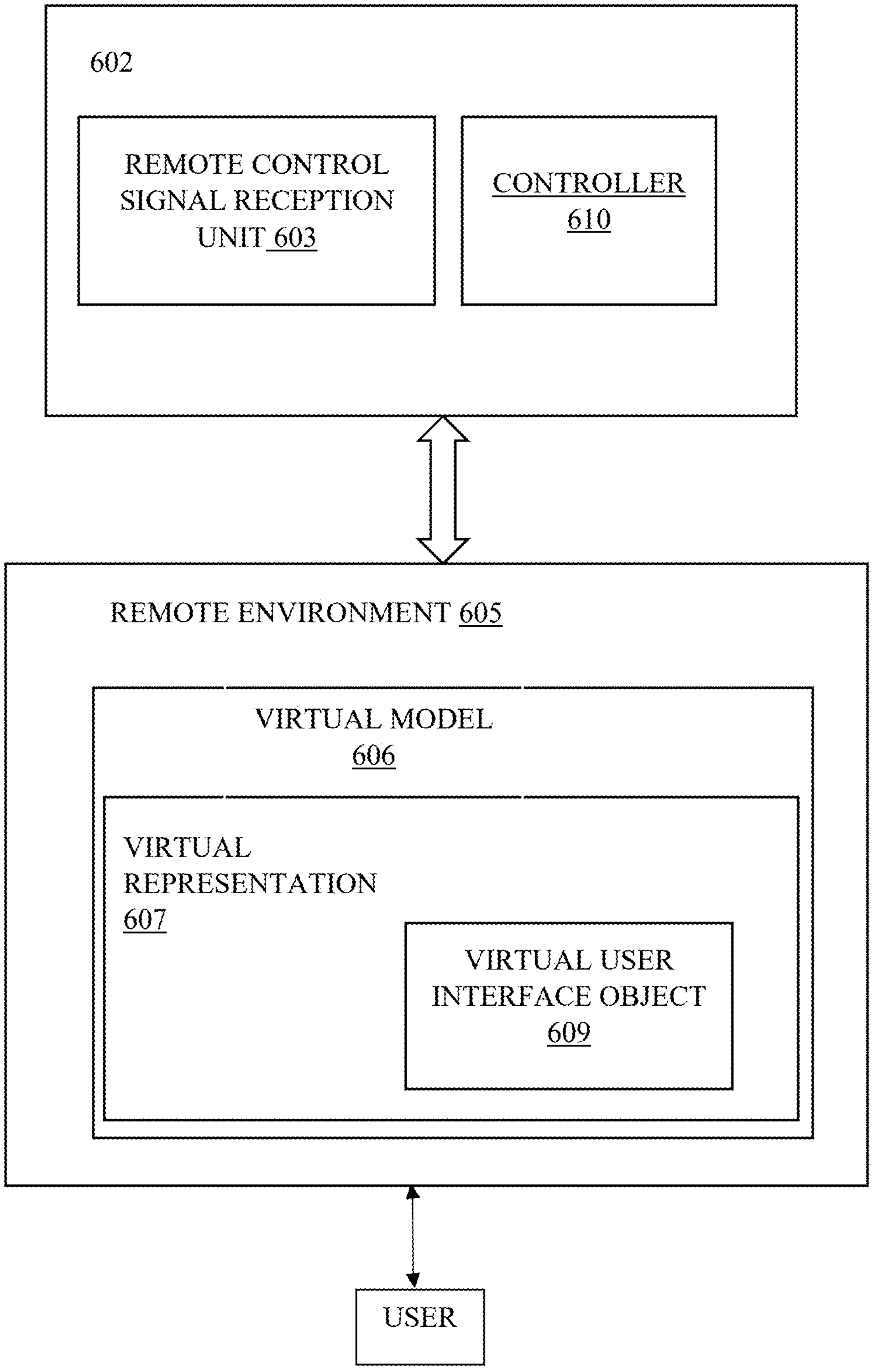
FIG. 6 illustrates a block diagram of a primary gaming unit operated from a virtual reality environment, according to one or more embodiments.

FIG. 6 illustrates a block diagram of a primary gaming unit 602 operated from a virtual reality environment, according to one or more embodiments. The primary gaming unit 602 comprises a remote control signal reception unit 603. The remote control signal reception unit 603 receives at least one of a first virtual control signal and a second virtual control signal from a remote environment 605. The remote environment 605 comprises one of an augmented reality environment, a virtual reality environment and a mixed reality environment. The remote environment 605 generates a virtual model 606 of the primary gaming unit 602. In an embodiment, the virtual model 606 comprises a virtual three-dimensional model. The virtual model 606 comprises a virtual representation 607 of the primary gaming unit 602 and a virtual user interface object 609 at a respective location in the virtual representation 607 of the primary gaming unit.

The virtual model 606 receives an input through at least one of the virtual representation 607 of the primary gaming unit and the virtual user interface object 609 in the virtual representation 607. For example, the user in the remote environment 605 approaches the virtual representation 607 of the primary gaming unit 602 and interacts through the virtual representation 607 and/or the virtual user interface object 609. The user may operate the virtual user interface object 609 (e.g., virtual joystick, virtual button, etc.) in the remote environment 605. The virtual environment also provides projections (e.g., illuminations) within the virtual model 606. The illuminations react and provide interactive reality augmentation in response to the input provided by the user. The interactive reality augmentation provides an immersive experience to the user. Immersive experiences use a blend of visuals, sound, and technology to deliver unforgettable and engaging worlds. The virtual model receives the input from the user and communicates at least one of the first virtual control signal and the second virtual control signal to the remote control signal reception unit in response to the input.

The remote control signal reception unit 603 of the primary gaming unit 602 receives the first virtual control signal and the second virtual control signal. The remote control signal reception unit 603 then communicates a command to the controller 610 in response to the virtual control signals. The controller 610 is configured to maneuver the picker seamlessly and simultaneously in at least one of the x direction and the y direction and to position the picker over the rack to pick an object in response to the first virtual control signal. The controller 610 is also configured to move the picker in a downward direction to pick an object. The controller is also configured to receive a signal from a button to close the claw to pick the object.

Figure 7:
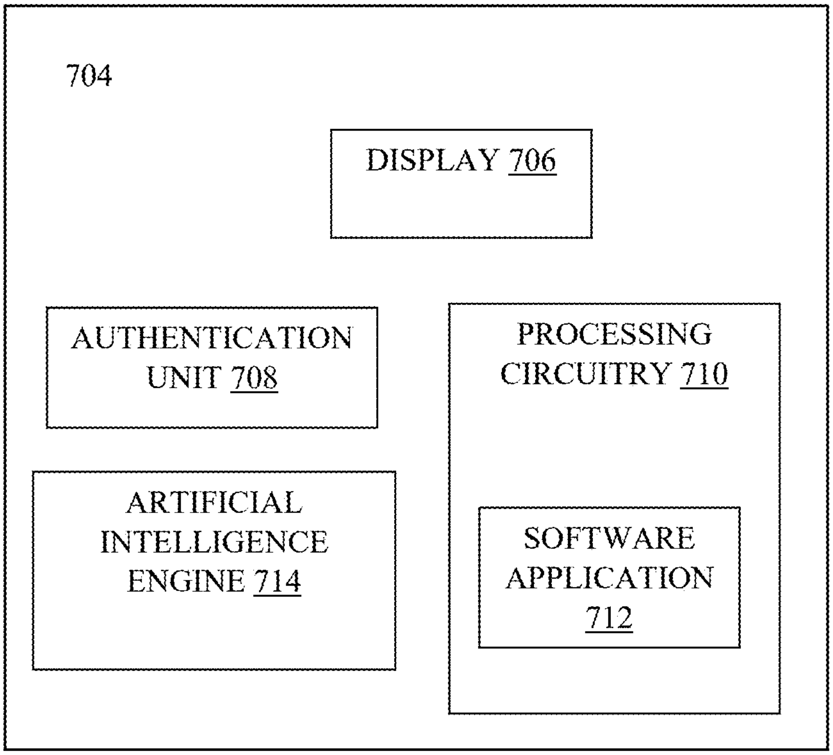
FIG. 7 illustrates a block diagram of a secondary gaming unit, according to one or more embodiments.

FIG. 7 illustrates a block diagram of a secondary gaming unit 704, according to one or more embodiments. The secondary gaming unit 704 comprises a display 706, an authentication unit 708, and a processing circuitry 710. The authentication unit 708 may comprise a card reader. The authentication unit 708 is configured to verify an identity of the user. The user may hold a card (e.g., RFID card, etc.) that holds identity information of the user. The authentication unit 708 reads the card associated with the user and verifies the identity of the user. The authentication unit 708 communicates a command to one of the primary gaming unit and the secondary gaming unit 704 upon verifying the identity of the user.

The processing circuitry 710 receives an activation signal from the primary gaming unit when the first output of the primary game is set as false, that is when a picker fails to pick an object. The processing circuitry 710 activates the secondary game upon receiving the activation signal. The processing circuitry 710 is further configured to execute the secondary game in response to a user input received through an input device; and generate a secondary reward, based on the second output of the secondary game. The secondary reward comprises a ticket to redeem the secondary reward from a dispenser. In an embodiment, the secondary reward provides an extra play in the primary gaming unit. The display 706 is communicatively coupled to the processing circuitry. The processing circuitry communicates a second signal to the display 706 depicting the secondary game, a point won by the user, a reward point, a recommendation, a suggestion, and a hint for winning the secondary game. The display 706 is communicatively coupled to the processing circuitry 710 to execute and depict the secondary game. The display 706 comprises an interactive display. In an embodiment, the display 706 comprises at least one of a Light-emitting diode (LED) display, a Liquid-crystal display (LCD) display, and a plasma display. The processing circuitry 710 is further configured to credit a playing chance to a user when the first output of the primary game is set as false to enable the user to play the secondary game. In an embodiment, the processing circuitry 710 is configured to credit the playing chance to the user by at least one of a physical prepaid card and a remote online credit transaction. The processing circuitry, using an artificial intelligence engine, is configured to convert the point won by the user to one of a gift, a token, and a ticket to the user based on the first output of the primary game.

The user may interact with the secondary gaming unit 704 through the input device. In an embodiment, the input device comprises at least one of a joystick, a button, arrow keys, a keypad, a touchpad, a scanner, a token receiver, and a coin receiver. The system may scan a token, to enable the secondary gaming unit for the user, through the scanner. The system may receive a token physically through the token receiver.

The processing circuitry 710 may be in a remote place. The processing circuitry 710 may also be located within the gaming system. The secondary gaming unit 704 may comprise one or more secondary games. The processing circuitry 710 comprises a software application 712. In an embodiment, the software application comprises a stand-alone application. In another embodiment, the software application comprises a client-server application. The software application 712 may be configured to launch the secondary game. The secondary gaming unit 704 comprises an artificial intelligence engine 714. In an embodiment, the artificial intelligence engine 714 may be within the primary gaming unit. The processing circuitry 710 may further be configured to select the secondary game among the one or more secondary games using the artificial intelligence engine 714. The user may interact with the secondary gaming unit 704 by providing a user input through an input device (e.g., keyboard, joystick, trackball, controller, smart device, media device, audio device, etc.). The artificial intelligence engine 714 is configured to analyze the behavior of the user through the user input. The artificial intelligence engine 714 further analyses a previous execution of the secondary game in response to the user input and generates at least one of a suggestion, a recommendation, and a hint based on the analysis of the behavior of at least one of the user and the previous execution of the secondary game. The artificial intelligence engine 714 analyses the behavior of the user by analyzing a pattern of the user input. The artificial intelligence engine 714 learns the behavior of the user by analyzing a pattern of the user input. The artificial intelligence engine 714 predicts upcoming user activity and provides suggestions (e.g., recommendations while playing the game) to the user to enhance the gaming experience of the user. The suggestions may be helpful to the user to win the game.

The processing circuitry 710 is configured to monitor the second output of the secondary game. In an embodiment, the processing circuitry 710 is configured to execute an additional play based on the second output of the secondary game. The processing circuitry 710 is further configured to credit a point (e.g., a playing chance) to the user upon determining that the user has won the game (e.g., primary game, secondary game). In an embodiment, the processing circuitry 710 is configured to credit a point (e.g., playing chance) based on the second output of the secondary game. The processing circuitry 710 uses the artificial intelligence engine 714 to convert the point to one of a gift, a token, and a ticket to the user based on an output of the secondary game. The processing circuitry 710 converts the point to one of the gift, the reward, the token, and the ticket based on redemption history of the user. The redemption history refers to details or logs regarding the user's previous redemptions.

In an embodiment, the processing circuitry 710 communicates a dispensing command to a dispenser to dispense at least one of the gift, the reward, the token, and the ticket to the user based on the second output of the secondary game.

Figure 8:
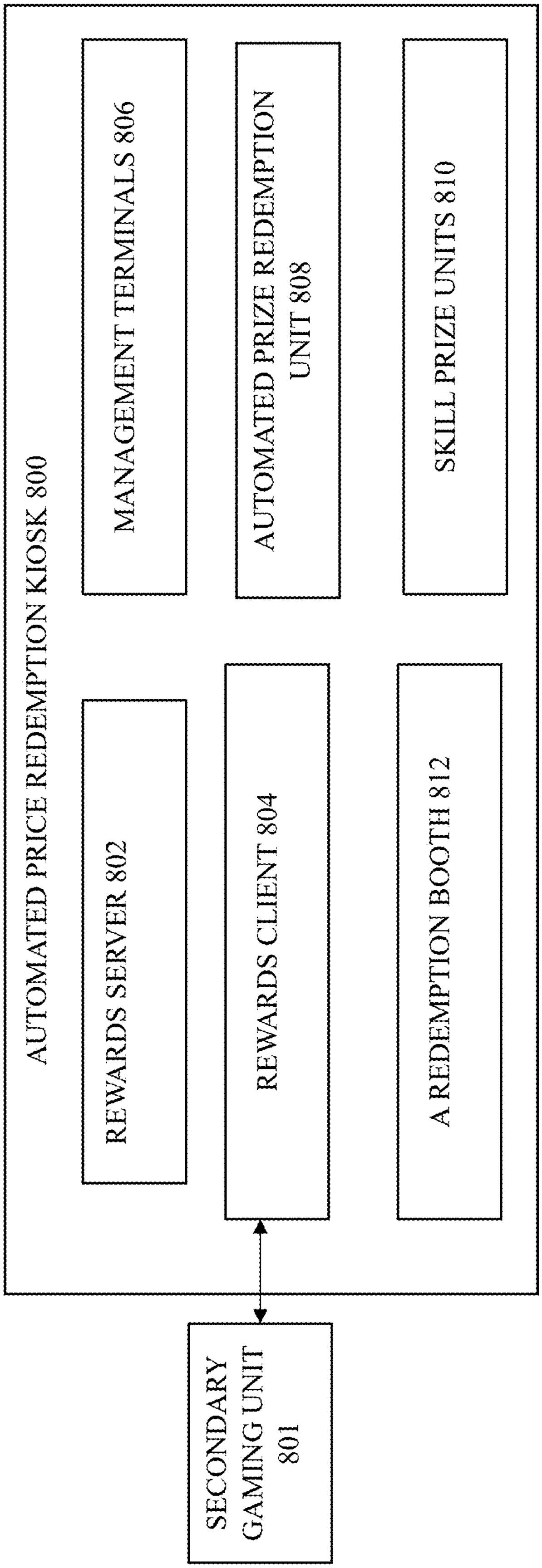
FIG. 8 illustrates a block diagram of the automated prize redemption kiosk, according to one or more embodiments.

In accordance with the invention, the secondary gaming unit 801 is also connected to an automated prize redemption kiosk 800 as shown in FIG. 8. The automated prize redemption kiosk 800 may comprise a rewards server 802 and one or more rewards clients. The rewards clients 804 may be associated with each primary gaming unit and secondary gaming unit and comprise a communication interface between the secondary gaming unit and the rewards server 802. The rewards clients 804 may comprise, for example, interfaces to the secondary gaming unit for collecting or reporting information from the secondary gaming unit to the rewards server 802.

The automated prize redemption kiosk 800 might also comprise one or more management terminals 806, one or more automated prize redemption units or centers 808, a redemption booth 812 and one or more amusement/skill prize units 810. As detailed below, the automated prize redemption kiosk 800 might also connect to one or more electronic player interfaces (EPIs).

The rewards server 802 may comprise a computing device that comprises a processor, memory for storing machine readable code that is executable by the processor (e.g., software), and a communication interface. The management terminals 806 may comprise a computer device or may be an interface terminal, and may include a display, a user input device, a processor, memory, software, etc. The software which the processors of the rewards servers 802 and management terminals 806 execute may be configured to cause them to implement the functionality described herein.

Figure 9:
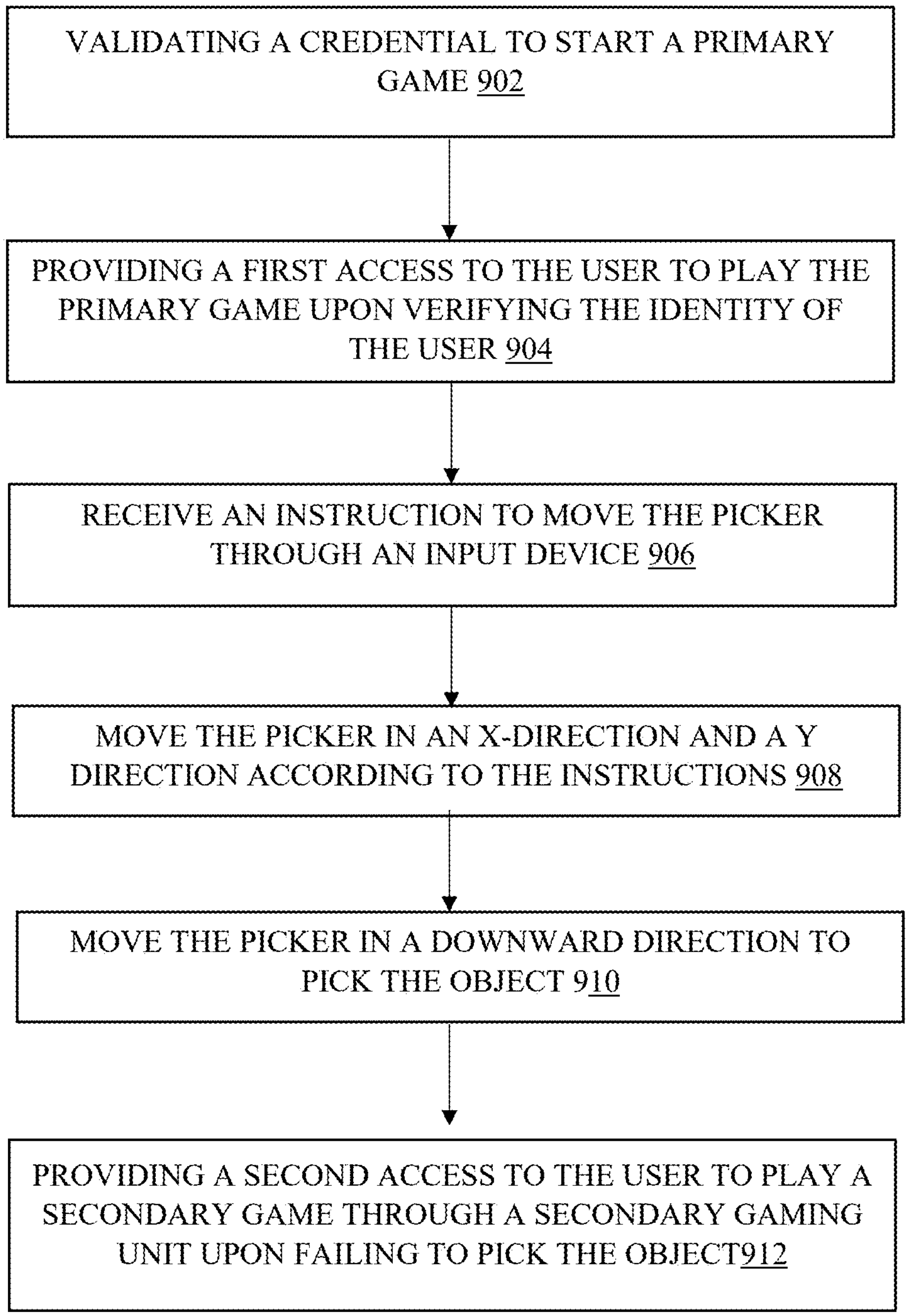
FIG. 9 illustrates a method of integration of primary gaming unit and secondary gaming unit, according to one or more embodiments.

FIG. 9 illustrates a method of integration of the primary gaming unit and the secondary gaming unit, according to one or more embodiments. At step 902, a credential is verified to start a primary game. In an embodiment, the credential is verified using a credential validator. The credential comprises one of a token, a bill, cash, a coin, a prepaid card, a smart card, an electronic card, a receipt, and a radio frequency identification (ID) card. The credential validator may be one of a bill acceptor, a receipt validator, a token receiver, a currency validator, etc. In an embodiment, the currency validator may determine denomination as well as characteristics of the currency (e.g., shape, size, color, security features, density, thickness, etc.) to validate the currency and provide communication to the controller to start the primary game. The same applies to starting the secondary game as well. In another embodiment, the token receiver receives and scans the token in order to validate the token. The token receiver scans the token and verifies the ID or encryption code (e.g., bar code, serial number, etc.) to validate the token. Once the token is validated, the token receiver may communicate a command to a controller to start the game. At step 904, a first access is provided to the user to play a primary game upon verifying the identity of the user. At step 906, a command is received to move the picker. At step 908, the picker is moved in an x direction and y direction. At step 910, move the picker to a downward direction to pick the object. The system determines, through a collection of sensors, a first output of the primary game. In an embodiment, the first output of the primary game is determined based on whether the picker picks an object or not. In an embodiment, the determination is performed using a collection of sensors. The sensor may be an RFID reader. In an embodiment, the controller determines if the object is picked, when an RFID reader stops receiving a signal from the RFID tag of the object. At step 912, a second access is provided to the user to play a secondary game through a secondary gaming unit based on the first output of the primary game.

In one embodiment, the system comprises a controller (e.g., electronic game module) in common with the primary gaming unit, the secondary gaming unit, the tertiary gaming unit, and the quaternary gaming unit. The controller, in common, may coordinate the activities of the gaming units that are connected to one another. The controller may receive the command from the credential validator and accordingly starts the game. The controller is configured to determine and monitor the output of the games. The controller is also responsible for coordinating and generating rewards based on the output of the games. The controller is further responsible for choosing and dispensing rewards to the players.

In an embodiment, the system may comprise a cyber security module.

In one aspect, a secure communication management (SCM) computer device for providing secure data connections is provided. The SCM computer device includes a processor 1008 in communication with memory. The processor 1008 is programmed to receive, from a first device, a first data message. The first data message is in a standardized data format. The processor 1008 is also programmed to analyze the first data message for potential cyber security threats. If the determination is that the first data message does not contain a cyber security threat, the processor 1008 is further programmed to convert the first data message into a first data format associated with the gaming environment (e.g., remote environment, etc.) and transmit the converted first data message to the gaming system using a first communication protocol associated with the gaming system.

According to an embodiment, secure authentication for data transmissions comprises, provisioning a hardware-based security engine (HSE) located in communications system, said HSE having been manufactured in a secure environment and certified in said secure environment as part of an approved network; performing asynchronous authentication, validation and encryption of data using said HSE, storing user permissions data and connection status data in an access control list used to define allowable data communications paths of said approved network, enabling communications of the communications system with other computing system subjects to said access control list, performing asynchronous validation and encryption of data using security engine including identifying a user device (UD) that incorporates credentials embodied in hardware using a hardware-based module provisioned with one or more security aspects for securing the system, wherein security aspects comprising said hardware-based module communicating with a user of said user device and said HSE.

Figure 10A:
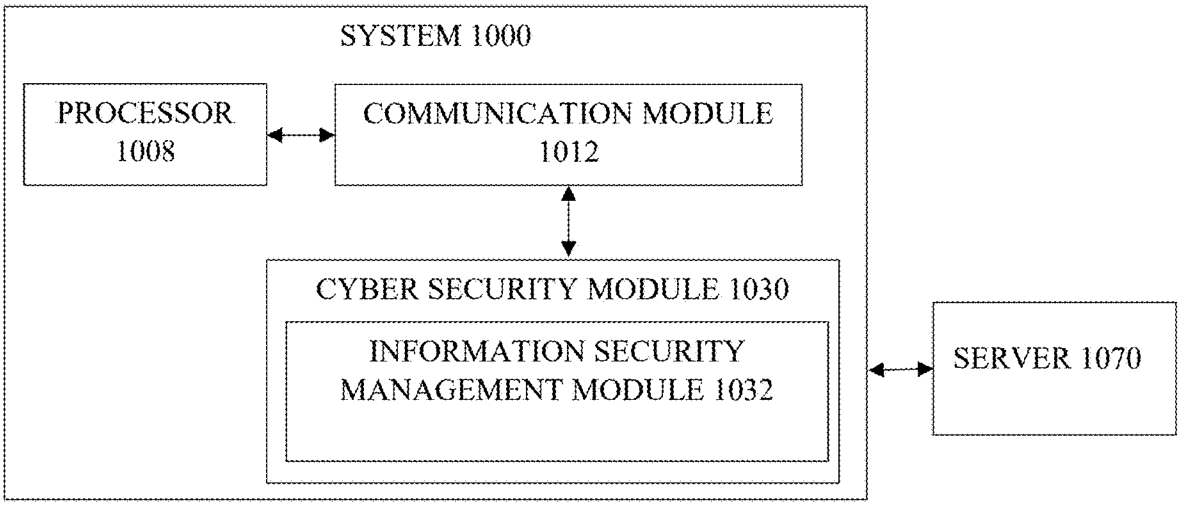
FIG. 10A shows a block diagram of the cyber security module in view of the system and server.

In an embodiment, FIG. 10A shows the block diagram of the cyber security module. The communication of data between the system 1000 and the server 1070 through the communication module 1012 is first verified by the information security management module 1032 before being transmitted from the system to the server or from the server to the system. The information security management module is operable to analyze the data for potential cyber security threats, to encrypt the data when no cyber security threat is detected, and to transmit the data encrypted to the system or the server.

Figure 10B:
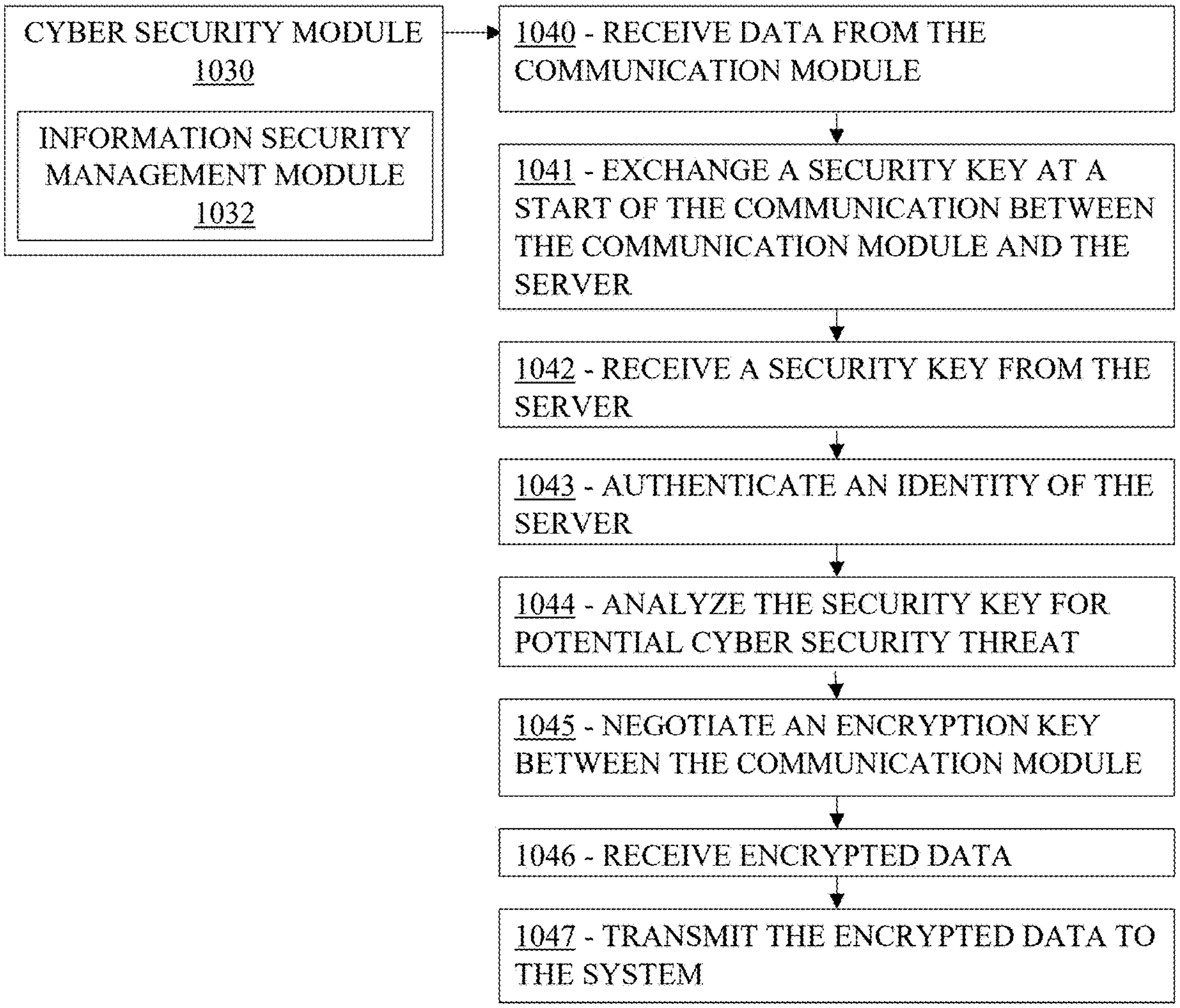
FIG. 10B shows an embodiment of the cyber security module.

In an embodiment, the cyber security module further comprises an information security management module providing isolation between the system and the server. FIG. 10B shows the flowchart of securing the data through the cyber security module 1030. At step 1040, the information security management module is operable to receive data from the communication module. At step 1041, the information security management module exchanges a security key at a start of the communication between the communication module and the server. At step 1042, the information security management module receives a security key from the server. At step 1043, the information security management module authenticates an identity of the server by verifying the security key. At step 1044, the information security management module analyzes the security key for potential cyber security threats. At step 1045, the information security management module negotiates an encryption key between the communication module and the server. At step 1046, the information security management module receives the encrypted data. At step 1047, the information security management module transmits the encrypted data to the server when no cyber security threat is detected.

Figure 10C:
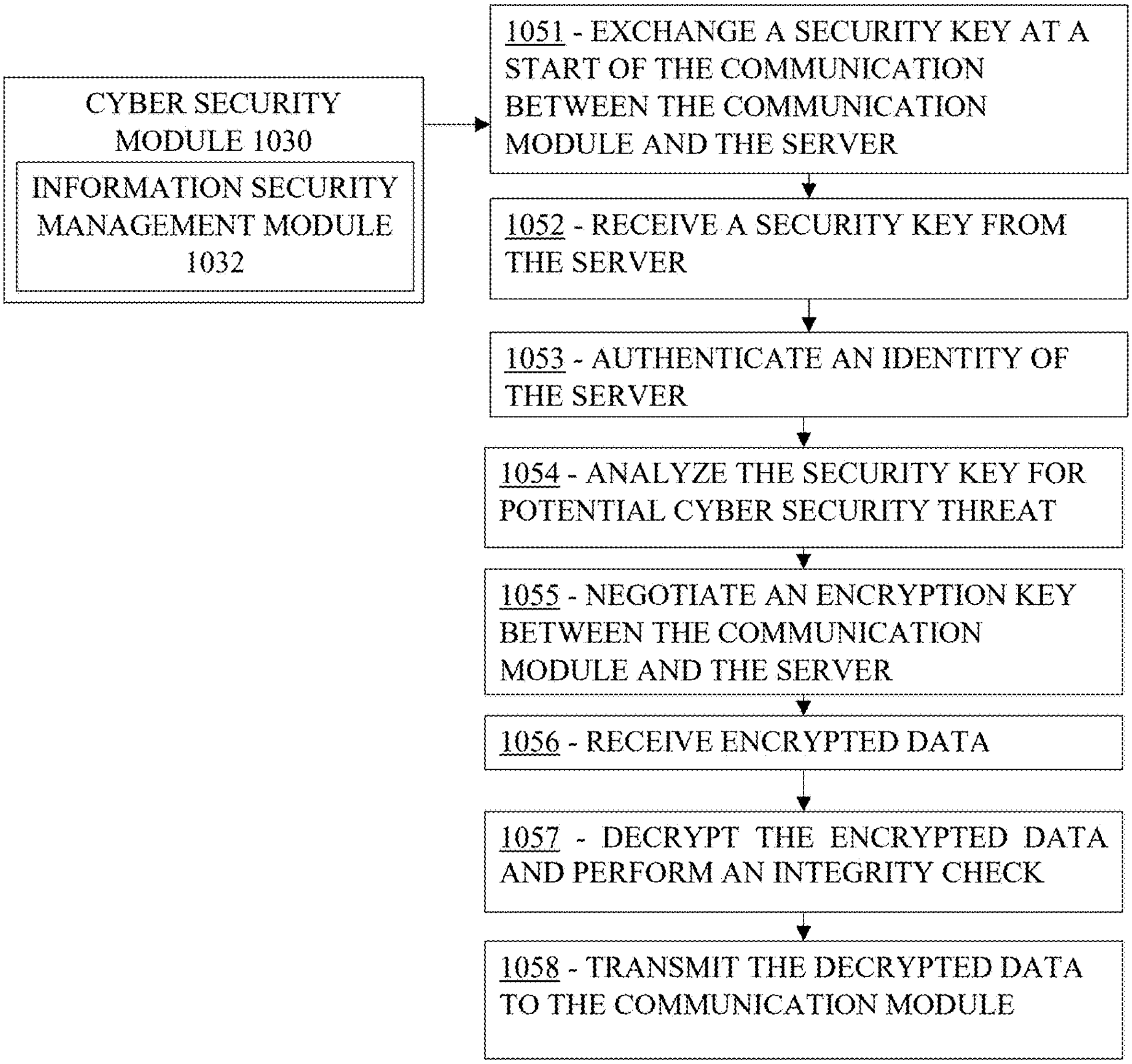
FIG. 10C shows another embodiment of the cyber security module.

In an embodiment, FIG. 10C shows the flowchart of securing the data through the cyber security module 1030. At step 1051, the information security management module is operable to: exchange a security key at a start of the communication between the communication module and the server. At step 1052, the information security management module receives a security key from the server. At step 1053, the information security management module authenticates an identity of the server by verifying the security key. At step 1054, the information security management module analyzes the security key for potential cyber security threats. At step 1055, the information security management module negotiates an encryption key between the communication module and the server. At step 1056, the information security management module receives encrypted data. At step 1057, the information security management module decrypts the encrypted data, and performs an integrity check of the decrypted data. At step 1058, the information security management module transmits the decrypted data to the communication module when no cyber security threat is detected.

In an embodiment, the integrity check is a hash-signature verification using a Secure Hash Algorithm 256 (SHA256) or a similar method.

In an embodiment, the information security management module is configured to perform asynchronous authentication and validation of the communication between the communication module and the server.

In an embodiment, the information security management module is configured to raise an alarm if a cyber security threat is detected. In an embodiment, the information security management module is configured to discard the encrypted data received if the integrity check of the encrypted data fails.

In an embodiment, the information security management module is configured to check the integrity of the decrypted data by checking accuracy, consistency, and any possible data loss during the communication through the communication module.

In an embodiment, the server is physically isolated from the system through the information security management module. When the system communicates with the server as shown in FIG. 10A, identity authentication is first carried out on the system and the server. The system is responsible for communicating/exchanging a public key of the system and a signature of the public key with the server. The public key of the system and the signature of the public key are sent to the information security management module. The information security management module decrypts the signature and verifies whether the decrypted public key is consistent with the received original public key or not. If the decrypted public key is verified, the identity authentication is passed. Similarly, the system and the server carry out identity authentication on the information security management module. After the identity authentication is passed on to the information security management module, the two communication parties, the system, and the server, negotiate an encryption key and an integrity check key for data communication of the two communication parties through the authenticated asymmetric key. A session ID number is transmitted in the identity authentication process, so that the key needs to be bound with the session ID number; when the system sends data to the outside, the information security gateway receives the data through the communication module, performs integrity authentication on the data, then encrypts the data through a negotiated secret key, and finally transmits the data to the server through the communication module. When the information security management module receives data through the communication module, the data is decrypted first, integrity verification is carried out on the data after decryption, and if verification is passed, the data is sent out through the communication module; otherwise, the data is discarded.

In an embodiment, the identity authentication is realized by adopting an asymmetric key with a signature.

In an embodiment, the signature is realized by a pair of asymmetric keys which are trusted by the information security management module and the system, wherein the private key is used for signing the identities of the two communication parties, and the public key is used for verifying that the identities of the two communication parties are signed. Signing identity comprises a public and a private key pair. In other words, signing identity is referred to as the common name of the certificates which are installed in the user's machine.

In an embodiment, both communication parties need to authenticate their own identities through a pair of asymmetric keys, and a task in charge of communication with the information security management module of the system is identified by a unique pair of asymmetric keys.

In an embodiment, the dynamic negotiation key is encrypted by adopting an Rivest-Shamir-Adleman (RSA) encryption algorithm. RSA is a public-key cryptosystem that is widely used for secure data transmission. The negotiated keys include a data encryption key and a data integrity check key.

In an embodiment, the data encryption method is a Triple Data Encryption Algorithm (3DES) encryption algorithm. The integrity check algorithm is a Hash-based Message Authentication Code (HMAC-MD5-128) algorithm. When data is output, the integrity check calculation is carried out on the data, the calculated Message Authentication Code (MAC) value is added with the header of the value data message, then the data (including the MAC of the header) is encrypted by using a 3DES algorithm, the header information of a security layer is added after the data is encrypted, and then the data is sent to the next layer for processing. In an embodiment the next layer refers to a transport layer in the Transmission Control Protocol/Internet Protocol (TCP/IP) model.

The information security management module ensures the safety, reliability, and confidentiality of the communication between the system and the server through the identity authentication when the communication between the two communication parties starts the data encryption and the data integrity authentication. The method is particularly suitable for an embedded platform which has less resources and is not connected with a Public Key Infrastructure (PKI) system and can ensure that the safety of the data on the server cannot be compromised by a hacker attack under the condition of the Internet by ensuring the safety and reliability of the communication between the system and the server.

Figure 11A:
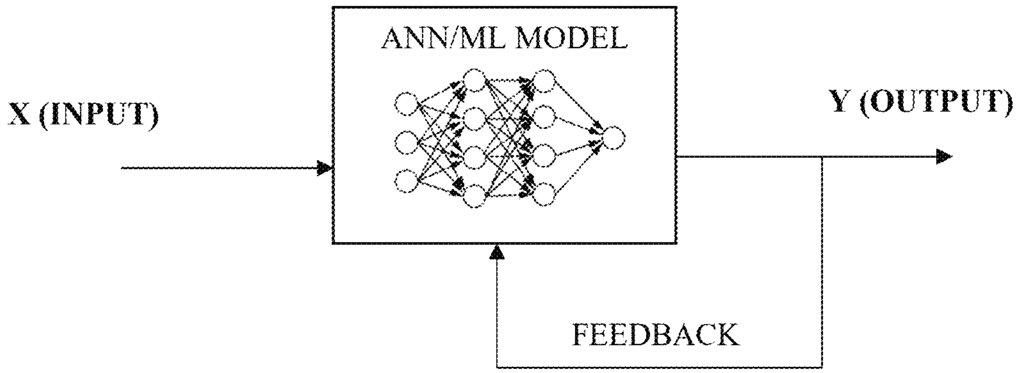
FIG. 11A shows a structure of the neural network/machine learning model with a feedback loop.

FIG. 11A shows a structure of the neural network/machine learning model with a feedback loop. Artificial neural networks (ANNs) model comprises an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed to the next layer of the network. A machine learning model or an ANN model may be trained on a set of data to take a request in the form of input data, make a prediction on that input data, and then provide a response. The model may learn from the data. Learning can be supervised learning and/or unsupervised learning and may be based on different scenarios and with different datasets. Supervised learning comprises logic using at least one of a decision tree, logistic regression, and support vector machines. Unsupervised learning comprises logic using at least one of a k-means clustering, a hierarchical clustering, a hidden Markov model, and an apriori algorithm. The output layer may predict or detect hints, suggestions, scores, game outputs, etc. based on the input data.

In an embodiment, ANNs may be a Deep-Neural Network (DNN), which is a multilayer tandem neural network comprising Artificial Neural Networks (ANN), Convolution Neural Networks (CNN) and Recurrent Neural Networks (RNN) that can recognize features from inputs, do an expert review, and perform actions that require predictions, creative thinking, and analytics. In an embodiment, ANNs may be Recurrent Neural Network (RNN), which is a type of Artificial Neural Networks (ANN), which uses sequential data or time series data. Deep learning algorithms are commonly used for ordinal or temporal problems, such as language translation, Natural Language Processing (NLP), speech recognition, and image recognition, etc. Like feed-forward and convolutional neural networks (CNNs), recurrent neural networks utilize training data to learn. They are distinguished by their "memory" as they take information from prior input via a feedback loop to influence the current input and output. An output from the output layer in a neural network model is fed back to the model through the feedback. The variations of weights in the hidden layer(s) will be adjusted to fit the expected outputs better while training the model. This will allow the model to provide results with far fewer mistakes.

The neural network is featured with the feedback loop to adjust the system output dynamically as it learns from the new data. In machine learning, backpropagation and feedback loops are used to train an AI model and continuously improve it upon usage. As the incoming data that the model receives increases, there are more opportunities for the model to learn from the data. The feedback loops, or backpropagation algorithms, identify inconsistencies and feed the corrected information back into the model as an input.

Even though the AI/ML model is trained well, with large sets of labelled data and concepts, after a while, the model's performance may decline while adding new, unlabelled input due to many reasons which include, but not limited to, concept drift, recall precision degradation due to drifting away from true positives, and data drift over time. A feedback loop to the model keeps the AI results accurate and ensures that the model maintains its performance and improvement, even when new unlabelled data is assimilated. A feedback loop refers to the process by which an AI model's predicted output is reused to train new versions of the model.

Initially, when the AI/ML model is trained, a few labelled samples comprising both positive and negative examples of the concepts (for e.g., suggestions, hints, recommendations, user behaviours, etc.) are used that are meant for the model to learn. Afterward, the model is tested using unlabelled data. By using, for example, deep learning and neural networks, the model can then make predictions on whether the desired concept/s (for e.g., suggestions, hints, recommendations) are in unlabelled images. Each image is given a probability score where higher scores represent a higher level of confidence in the model's predictions. Where a model gives an image a high probability score, it is auto labelled with the predicted concept. However, in the cases where the model returns a low probability score, this input may be sent to a controller (may be a human moderator) which verifies and, as necessary, corrects the result. The human moderator may be used only in exception cases. The feedback loop feeds labelled data, auto-labelled or controller-verified, back to the model dynamically and is used as training data so that the system can improve its predictions in real-time and dynamically.

Figure 11B:
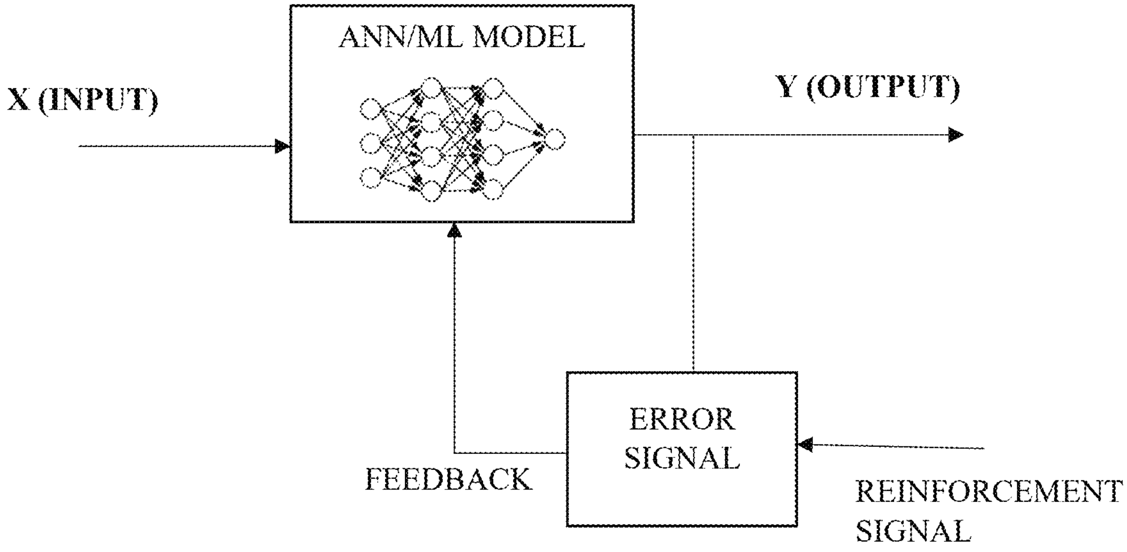
FIG. 11B shows a structure of the neural network/machine learning model with reinforcement learning.

FIG. 11B shows a structure of the neural network/machine learning model with reinforcement learning. The network receives feedback from authorized networked environments. Though the system is similar to supervised learning, the feedback obtained in this case is evaluative not instructive, which means there is no teacher as in supervised learning. After receiving the feedback, the network performs adjustments of the weights to get better predictions in the future. Machine learning techniques, like deep learning, allow models to take labeled training data and learn to recognize those concepts in subsequent data and images. The model may be fed with new data for testing, hence by feeding the model with data it has already predicted over, the training gets reinforced. If the machine learning model has a feedback loop, the learning is further reinforced with a reward for each true positive of the output of the system. Feedback loops ensure that AI results do not stagnate. By incorporating a feedback loop, the model output keeps improving dynamically and over usage/time.

Figure 12:
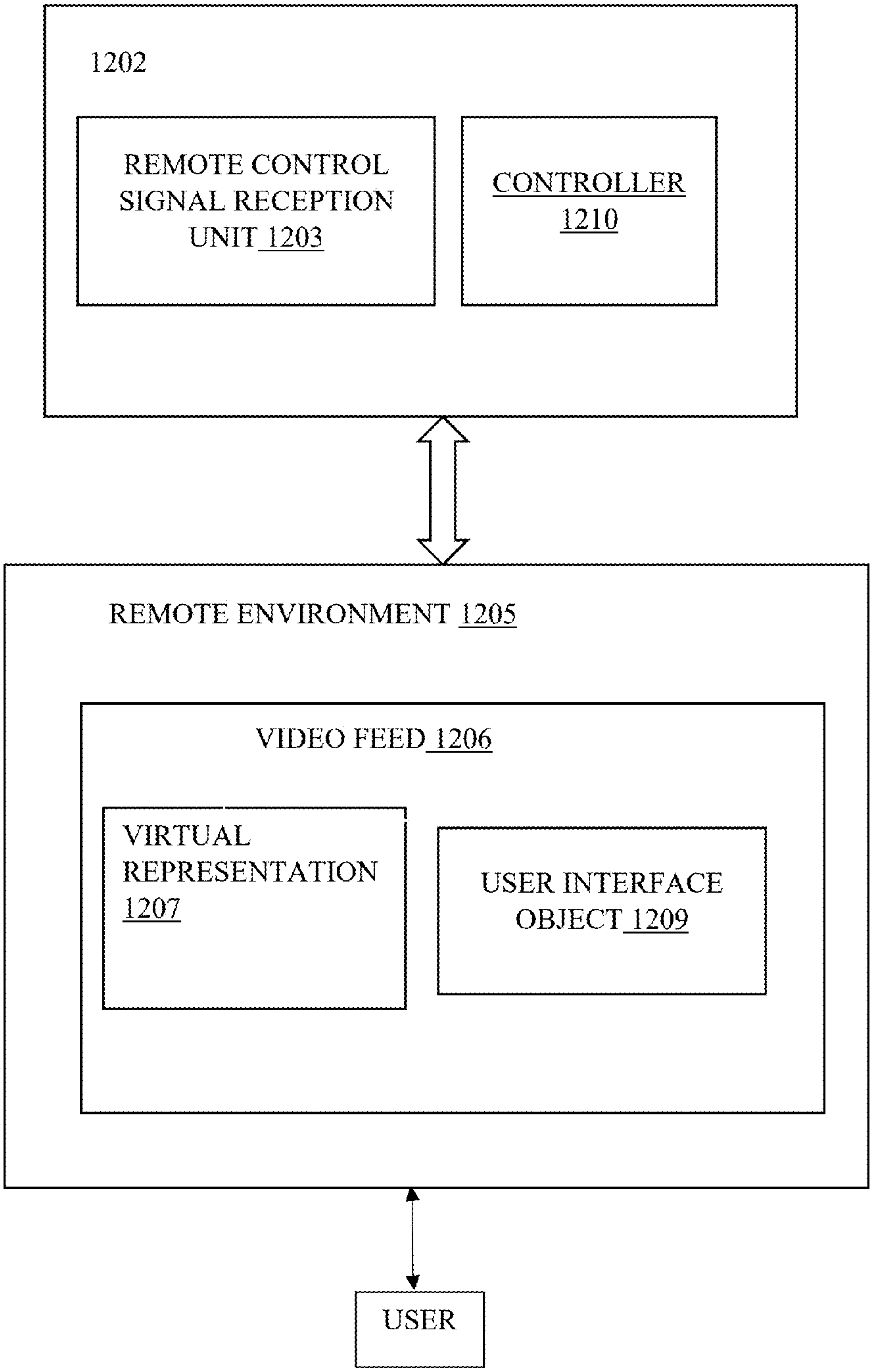
FIG. 12 illustrates a block diagram of a primary gaming unit operated from a remote environment, according to one or more embodiments.

FIG. 12 illustrates a block diagram of a primary gaming unit 1202 operated from a remote environment, according to one or more embodiments. The primary gaming unit 1202 comprises a remote control signal reception unit 1203. The remote control signal reception unit 1203 receives at least one of a first virtual control signal and a second virtual control signal from a remote environment 1205. The remote environment 1205 telecasts a video feed. The video feed is captured at the location of the primary gaming unit using a camera (e.g., high definition camera). The remote environment 1205 telecasts the video feed 1206 of the primary gaming unit 1202 in real-time. The changes happening at the site of the primary gaming unit is reflected at the video feed telecasted at the remote environment in real-time. In an embodiment, the video feed 1206 provides a virtual representation 1207 of the primary gaming unit 1202 and a user interface object 1209.

The remote environment 1205 comprises a remote control unit that receives an input through at least one of the virtual representation 1207 of the primary gaming unit and the user interface object 1209. For example, the user in the remote environment 1205 approaches the virtual representation 1207 of the primary gaming unit 1202 and interacts through the virtual representation 1207 and/or the user interface object 1209. The user may operate the user interface object 1209 (e.g., joystick, button, etc.) in the remote environment 1205. The remote control unit receives the input from the user and communicates at least one of the first virtual control signal and the second virtual control signal to the remote control signal reception unit in response to the input.

The remote control signal reception unit 1203 of the primary gaming unit 1202 receives the first virtual control signal and the second virtual control signal. The remote control signal reception unit 1203 then communicates a command to the controller 1210 in response to the virtual control signals. The controller 1210 is configured to perform a first function to play the game (e.g., maneuver the picker seamlessly and simultaneously in at least one of the x direction and the y direction and to position the picker over the rack to pick an object) in response to the first virtual control signal. The controller 1210 is also configured to perform a second function (e.g., move the picker in a downward direction to pick an object).

The processing circuitry, using an artificial intelligence engine, credits a playing chance to the user upon determining that the user has won the game. In an embodiment, the processing circuitry, using the artificial intelligence engine provides an additional chance to play the game (e.g., primary game, secondary game) upon determining that the user has won the game. In another embodiment, the processing circuitry, using artificial intelligence engine, provides at least one of a gift, a token, and a ticket to the user based on the first output of the primary game or the second output of the secondary game.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a non-transitory machine-readable medium and/or integrated primary and secondary gaming system. Accordingly, the specification and drawings are to be regarded in an illustrative rather than a restrictive sense.

INCORPORATION BY REFERENCE

All publications, patents, and patent applications cited in this Specification are hereby incorporated by reference in their entirety, including:

CN201510792106 entitled "Movable gantry type micro array sensor preparing device";
KR102218596B1 entitled "Portable lift for crane";
U.S. Pat. No. 7,951,008B2 entitled "Non-volatile memory management technique implemented in a gaming machine";
U.S. Pat. No. 8,632,406B2 entitled "Player tracking communication mechanisms in a gaming machine";
U.S. Pat. No. 6,007,426A entitled "Skill based prize games for wide area networks";
U.S. Pat. No. 8,506,373B2 entitled "Amusement device prize awarding system and method";
U.S. Pat. No. 8,721,431B2 entitled "Systems, methods, and devices for providing instances of a secondary game";
JP2014111197A entitled "Crane game machine";
U.S. Pat. No. 11,288,930B1 entitled "Game method using ticket output game machine";
U.S. Pat. No. 11,423,742B2 entitled "Player tracking system with prizes awarded via skill/amusement gaming device play."
U.S. Pat. No. 20040152522A1 entitled "Arcade style video game adapter system."
U.S. Pat. No. 10,621,820B2 entitled "Intermediate in-game resource hybrid gaming system."
U.S. Pat. No. 8,251,369B2 entitled "Game machine."

What is claimed is:

1. A system comprising:
a primary gaming unit that provides a primary game to a user;
a secondary gaming unit that provides a secondary game to the user; and
an integrated gaming controller,
wherein the integrated gaming controller is operable to:
start a first play in the primary game through the primary gaming unit; and
start a second play in the secondary game through the secondary gaming unit based on a primary game output;
wherein the primary gaming unit is integrated with the secondary gaming unit through the integrated gaming controller,
wherein the primary game output is in conjunction with a secondary game output, and
wherein the system further comprises an artificial intelligence engine that learns continuously from an input, a play of a player depicting a behavior of the player to generate a recommendation, a hint and a suggestion to enhance the play of the player that is ongoing on one of the primary game and the secondary game.

2. The system of claim 1, wherein the primary game comprises one of a physical game, an arcade game, an online game, a client-server game, a video game, an electronic game, a digital game, and a stand-alone game.

3. The system of claim 1, wherein the secondary game comprises one of a physical game, an arcade game, an online game, a client-server game, a video game, an electronic game, a digital game, and a stand-alone game.

4. The system of claim 2, wherein the physical game comprises:
a picker to pick an object;
a controller;
wherein the controller is operable to:
receive a command to move the picker, through an input device;
move the picker in at least one of an x-direction, y-direction and z-direction according to the command; and
move the picker in a downward direction to pick the object;

wherein a collection of sensors provides a first signal to determine that the object is picked as the primary game output, and wherein the picker is one of a claw and a crane.

5. The system of claim 1, wherein both the primary game and the secondary game comprise at least one of a game of skill and a game of chance.

6. The system of claim 4, wherein the physical game further comprises a gantry that supports the picker and a rack to place the object, wherein the object comprises an RFID tag.

7. The system of claim 4, wherein the collection of sensors comprises a collection of infrared proximity sensors, RFID readers, light sensors, movement sensors, and weight sensors.

8. The system of claim 6, wherein the system comprises at least one of a tertiary gaming unit and a quaternary gaming unit integrated with the primary gaming unit and the secondary gaming unit.

9. The system of claim 4, wherein when the object is picked by the picker, the primary game output is set as true, a primary reward is generated, and the primary game is ended; and wherein when the picker fails to pick the object, the primary game output is set as false.

10. The system of claim 2, wherein the primary gaming unit comprises a plurality of physical gaming cabinets synchronized with each other.

11. The system of claim 9, wherein the secondary gaming unit comprising the digital game as the secondary game comprises:

a processing circuitry configured to:

receive an activation signal from the primary gaming unit;

activate the secondary game upon receiving the activation signal;

execute the secondary game in response to a user input received through the input device; and generate a secondary reward, based on the secondary game output, wherein the secondary reward comprises one of a token, a ticket, a printed receipt, a point, a playing chance, a digital receipt, and a gift.

12. The system of claim 11, wherein the secondary game comprises:

a display communicatively coupled to the processing circuitry, wherein the processing circuitry communicates a second signal to the display to depict the secondary game, a point won by the user, a recommendation, a suggestion, and a hint for winning the secondary game, wherein the display comprises at least one of light-emitting diode (LED) display, a liquid-crystal display (LCD) display, an organic light-emitting diode (OLED), a transparent display, a hologram, a projector, an augmented reality display, a virtual reality display, a mixed reality display, and a plasma display.

13. The system of claim 12, wherein the processing circuitry communicates a dispensing command to a dispenser to dispense at least one of the gift, the token, cash, a coin, and the ticket to the user based on the secondary game output.

14. The system of claim 4, wherein a credential to enable the primary gaming unit for a player is verified through a credential validator, wherein the credential comprises one of a token, a bill, cash, a coin, a prepaid card, a smart card, an electronic card, a receipt, and a radio frequency identification (ID) card.

15. The system of claim 11, wherein the primary gaming unit further comprises:

a remote control signal reception unit that receives at least one of a first virtual control signal and a second virtual control signal from a remote environment, wherein the remote environment generates a virtual model of the primary gaming unit; and wherein the virtual model receives an input through at least one of a virtual representation of the primary gaming unit and a virtual user interface object in the virtual representation.

16. The system of claim 2, wherein the primary gaming unit comprising the digital game as the primary game comprises:

a controller operable to:

activate a playing chance for the primary game;

execute the primary game in response to a user input received through an input device;

determine the primary game output; and communicate an activation signal to the secondary gaming unit when the primary game output is set as true.

17. The system of claim 16, wherein the secondary gaming unit comprising the physical game as the secondary game comprises:

a picker to pick an object;

a processing circuitry;

wherein the processing circuitry is operable to:

receive the activation signal from the primary gaming unit;

receive a command to move the picker through the input device;

move the picker in at least one of an x-direction, y-direction and z-direction according to the command; and move the picker in a downward direction to pick the object; and wherein a collection of sensors provides a first signal to determine the object is picked as the secondary game output; and wherein the secondary gaming unit generates a secondary reward, based on the secondary game output, wherein the secondary reward comprises one of a token, a ticket, a printed receipt, a point, the playing chance, a digital receipt, and a gift.

18. A method comprising:

receiving a credential to start a primary game;

starting a first play in the primary game through a primary gaming unit; and starting a second play in a secondary game through a secondary gaming unit based on a primary game output;

wherein the primary gaming unit and the secondary gaming unit are connected to each other through an integrated gaming controller;

wherein the primary game output and a secondary game output are in conjunction, and wherein the method further comprises learning continuously from an input, a play of a player depicting a behavior of the player to generate a recommendation, a hint, and a suggestion to enhance the play of the player that is ongoing on one of the primary game and the secondary game.

19. A non-transitory computer storage medium storing a sequence of instructions, which when executed by a processor, cause the processor to:

receive a credential to start a primary game;

start a first play in the primary game through a primary gaming unit; and start a second play in a secondary game through a secondary gaming unit based on a primary game output;

wherein the primary gaming unit and the secondary gaming unit are connected to each other through an integrated gaming controller;

wherein the primary game output and a secondary game output are in conjunction; and wherein the instructions further cause the process to learn continuously from an input, a play of a player depicting a behavior of the player to generate a recommendation, a hint, and a suggestion to enhance the play of the player that is ongoing on one of the primary game and the secondary game.

* * * * *